(12) United States Patent
Morita et al.

(10) Patent No.: US 8,046,087 B2
(45) Date of Patent: Oct. 25, 2011

(54) ELECTRONIC CONTROLLER FOR POWER CONVERTER AND MOTOR DRIVE CIRCUIT

(75) Inventors: Yuichiro Morita, Hitachi (JP); Kotaro Shimamura, Hitachinaka (JP); Kunihiko Tsunedomi, Hitachi (JP); Shinya Imura, Toride (JP); Shoji Sasaki, Hitachinaka (JP); Takanori Yokoyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 10/980,772

(22) Filed: Nov. 4, 2004

(65) Prior Publication Data

US 2005/0143841 A1 Jun. 30, 2005

(30) Foreign Application Priority Data

Nov. 4, 2003 (JP) ................................ 2003-374737

(51) Int. Cl.
*G05B 15/02* (2006.01)
(52) U.S. Cl. ............... 700/10; 700/14; 700/90; 348/87; 341/141
(58) Field of Classification Search .................. 700/10, 700/14, 90; 348/87; 341/141
See application file for complete search history.

(56) References Cited

U.S. PATENT DOCUMENTS

| | | | | |
|---|---|---|---|---|
| 5,541,601 A | * | 7/1996 | Goto et al. | 341/141 |
| 5,631,817 A | * | 5/1997 | Minami | 363/98 |
| 5,933,344 A | * | 8/1999 | Mitsuishi et al. | 700/13 |
| 6,194,856 B1 | * | 2/2001 | Kobayashi et al. | 318/432 |
| 6,453,739 B1 | * | 9/2002 | Saikalis et al. | 73/204.14 |

FOREIGN PATENT DOCUMENTS

| | | |
|---|---|---|
| JP | 58-182750 A | 10/1983 |
| JP | 4-287747 A | 10/1992 |
| JP | 5-266218 A | 10/1993 |
| JP | 5-324862 A | 12/1993 |
| JP | 06-324811 | 11/1994 |
| JP | 9-269870 A | 10/1997 |
| JP | 10-285910 | 10/1998 |

OTHER PUBLICATIONS

"RS-232 Made Easy: Connecting computers, printers, terminals, and modems" Martin Seyer. Publisher: Prentice Hall. Jan. 1984. ISBN-10: 0137498543. ISBN-13: 9780137498543. Chapters 3, 5 & 7.*
Japanese office action dated Jun. 3, 2008 with English translation (5 pages).

* cited by examiner

*Primary Examiner* — Kakali Chaki
*Assistant Examiner* — Tejal Gami
(74) *Attorney, Agent, or Firm* — Crowell & Moring LLP

(57) ABSTRACT

The electronic controller fetches an external signal and performs an input process such as A-D conversion. Upon receipt of processing results for executing operations according to a predetermined program, an output process is performed for sending a signal to the outside board on operation results, a timer outputs at least two of an input process start signal for starting the input process, an output process start signal for starting the output process, and an operation start signal for starting the operation.

15 Claims, 29 Drawing Sheets

ELECTRONIC CONTROLLER FOR POWER CONVERTER AND MOTOR DRIVE CIRCUIT

CLAIM OF PRIORITY

The present application claims priority from Japanese patent application serial no. 2003-374737, filed on Nov. 4, 2003, the content of which is hereby incorporated by reference into this application.

BACKGROUND OF THE INVENTION

The present invention relates to an electronic controller for repeatedly executing an input process (A-D conversion, etc.), operations (program execution), and an output process (output by a serial signal) in a predetermined cycle.

In a power conversion system and a power supply system for controlling power and an industrial system and a traffic system for controlling a motor, a power converter and a motor drive circuit composed of many switching elements are controlled by an electronic controller, thus power conversion and motor driving are realized. Such an electronic controller repeatedly executes in a predetermined cycle the action of sampling a current and a voltage of a power line and a motor, thereby performing A-D conversion, performing operations on the basis of the converted digital value, generating a pulse signal on the basis of the command value obtained from the calculated result, and turning on or off the switching elements of the power converter and motor drive circuit. This cycle is called a control cycle.

In the power control and motor control, it is required to improve the control accuracy, thus high-speed control such as a control cycle of less than several hundreds microseconds or several tens microseconds is required.

For such control, it is necessary not only to surely execute sampling for the A-D conversion at predetermined timing but also to surely output the command value and pulse signal at predetermined timing. For example, even if the sampling for the A-D conversion is executed in a predetermined cycle at predetermine timing, when the command value and pulse signal are outputted immediately after completion of the operations, the required time for the operations varies with the conditions at that time, so that an error is caused at the output timing of the command value and pulse signal.

As an art for solving it, for example, as described in Japanese Laid-open Patent Publication No. Hei 10-285910, pages 1 to 21 and FIGS. 1 to 15, it is known to provide the control cycle for performing the sampling (input process) for the A-D conversion and the pulse generation (output process) cycle for generating the pulse signal, make the difference in phase between them fixed, and execute the sampling for the A-D conversion and outputting the on/off pulse in the respective cycles.

By doing this, the sampling for the A-D conversion and the outputting of the pulse signal can be surely executed at predetermined timing, and the pulse generation cycle is adjusted to expectable operation end timing, thus the response time from the sampling (input process) for the A-D conversion to the outputting (output process) of the pulse signal can be shortened.

On the other hand, for example, in Japanese Laid-open patent Publication No. Hei 06-324811, pages 1 to 15 and FIGS. 1 to 9, it is proposed under control of an A-D converter having a plurality of input channels to send data after A-D conversion at external timing, prevent a control circuit (operation means) from frequent interruptions of data after conversion from the A-D conversion means, thereby lighten the processing load on the control circuit.

SUMMARY OF THE INVENTION

However, in the electronic controller described in Japanese Laid-open Patent Publication No. Hei 10-285910, the timer for executing sampling for A-D conversion and the timer for outputting a pulse signal are separately prepared, thus a control circuit for synchronizing a timer circuit and timers is required, and the circuit scale is increased.

Further, in the electronic controller described in Japanese Laid-open patent Publication No. Hei 06-324811, the processing load of the control circuit is lightened by sending data after A-D conversion at external timing. However, effects of shortening the control cycle and shortening the response time from A-D conversion (input process) to outputting (output process) of a command value free of variations cannot be expected.

The present invention was developed to solve the aforementioned problems and is intended to provide an electronic controller capable of surely performing an input process and an output process at appropriate timing by use of a simple circuit constitution and effectively realizing shortening of the control cycle, shortening of the response time from the input process to the output process, lightening of the processing load of an operation means, and improvement of the control accuracy.

To accomplish the above object, the electronic controller relating to the present invention basically includes an input means for fetching an external signal and performing an input process such as A-D conversion, an operation means, upon receipt of the processing results of the input means, for executing operations according to a predetermined program, an output means for performing the output process for a signal to the outside on the basis of operation results of the operation means, and a timer means for individually setting process start timing of the input means and/or the output means not via the operation means.

The timer means preferably sets the process start timing of the operation means.

In the preferred embodiment of the present invention, at least two of the input processing period of the input means, the operation processing period of the operation means, and the output processing period of the output means are partially overlaid each other.

Further, the timer means preferably sets the process start timings so that the process start timings of at least two of the input means, operation means, and output means become the same timing or those timings have a fixed time difference.

Furthermore, the timer means preferably sets the process start timing so that before completion of the operations of the operation means, the input means starts the next input process.

On the other hand, another electronic controller relating to the present invention includes an input means for fetching an external signal and performing an input process such as A-D conversion, an operation means, upon receipt of the processing results of the input means, for executing operations according to a predetermined program, an output means for performing the output process for a signal to the outside on the basis of the operation results of the operation means, and a timer means for outputting at least two of an input process start signal for starting the input process by the input means, an output process start signal for starting the output process by the output means, and an operation start signal for starting the operation by the operation means.

In the preferred embodiment of the present invention, the input process, operation process, and output process are executed in parallel.

In another preferred embodiment, the timer means outputs the process start signals so that the process start timings of at least two of the input means, operation means, and output means become the same timing or those timings have a fixed time difference.

Further, the timer means preferably outputs the process start signal so that before completion of the operations of the operation means, the input means starts the next input process.

The electronic controller having the aforementioned constitution relating to the present invention, since the process start timings of at least two of the input process such as the A-D conversion, operation, and output process such as serial transmission are set by the timer means, can surely execute the input process and output process at appropriate timing by use of a simple circuit constitution.

Additionally, the input process, operation, and output process are executed in parallel (the processing periods are overlaid partially), so that the control cycle can be shortened, and the response time from the input process to the output process can be shortened, thus the response and control accuracy can be effectively improved.

Further, the operation means does not need to execute a start process of the input means and/or a start process of the output means, so that the load on the operation means can be lightened and the lightened load can be allocated to other processes.

Furthermore, the input processing means outputs an input process completion signal, and the operation means, on the basis of a signal inputted to it and the operation results, changes the timing for outputting at least one of the input process start signal, output process start signal, and operation start signal by the timer means, thereby can switch the control mode.

Further, the operation means, when the present operation is not completed even if the operation start signal is outputted, starts the next operation after the present operation is completed, so that even if the operation (execution of the program) is delayed, the operation means can surely execute the next operation (execution of the program).

Furthermore, the output means, when the present output process is not completed even if the output process start signal is outputted, starts the next output process after the present output process is completed, thereby even if the present output process is delayed, can surely execute the next output process.

Further, the electronic controller relating to the present invention may be realized by a 1-chip microcontroller LSI and may be realized by a two-chip or more microcontroller LSI or an input-output controller LSI.

As understood by the above explanation, the electronic controller relating to the present invention, since the process start timings of at least two of the input process such as the A-D conversion, operation, and output process such as serial transmission are set by the timer means, can surely execute the input process and output process at appropriate timing by use of a simple circuit constitution.

Additionally, the input process, operation, and output process can be executed in parallel, so that the control cycle can be shortened, and the response time from the input process to the output process can be shortened, thus the response and control accuracy can be effectively improved.

Further, the operation means does not need to execute a start process of the input means and/or a start process of the output means, so that the processing load on the operation means can be lightened and the lightened load can be allocated to other processes.

DETAILED DESCRIPTION OF THE PREFERRED EMBODIMENTS

Hereinafter, the embodiments of the electronic controller of the present invention will be explained with reference to the accompanying drawings.

First Embodiment

Figure 1:
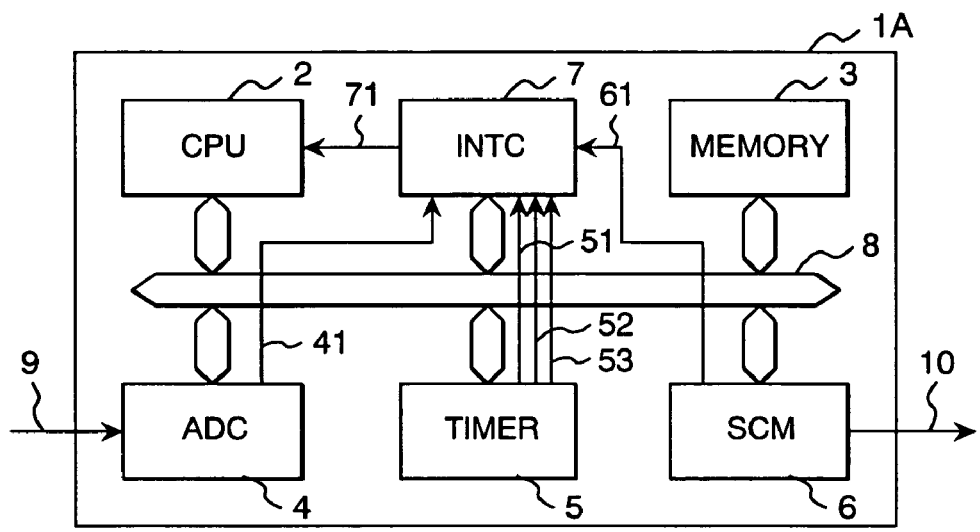
FIG. 1 is a schematic block diagram showing the first embodiment of the electronic controller relating to the present invention.

FIG. 1 is a schematic block diagram showing the first embodiment of the electronic controller relating to the present invention.

An electronic controller 1A of the first embodiment shown in the drawing has a central processing unit (CPU) 2, a memory 3, an A-D converter (ADC) 4 as an input means for fetching an analog signal (detection signal) 9 from one or a plurality of sensors externally arranged and converting it to a digital value, a timer 5 for outputting first, second, and third compare match signals 51, 52, and 53 at predetermined timing (will be described later), a serial communication module (SCM) 6 as an output means for transferring data to another device (to be controlled) via a serial transmission path 10, and an interruption controller (INTC) 7 for receiving the compare match signals 51, 52, and 53 outputted by the timer 5, an A-D conversion completion signal 41 outputted by the A-D converter (ADC) 4, and a transmission completion signal 61 outputted by the serial communication module (SCM) 6 and outputting an interruption signal 71 to the CPU 2 and these units are connected by a system bus 8.

In the electronic controller 1A, on the basis of the count of the timer 5, series control is repeatedly executed in a fixed cycle (hereinafter, called a control cycle) that the A-D converter (ADC) 4 performs an input process of fetching the analog signal (detection signal) 9 from one or a plurality of sensors and converting it to a digital value, and the CPU 2 executes operations according to a program predetermined on the basis of the data, and the serial communication module (SCM) 6 performs an output process of transmitting the operation results to another external device (to be controlled) via the serial transmission path 10.

In the memory 3, a program for activating the A-D converter (ADC) 4 and starting the input process (A-D conversion), a program for executing operations on the basis of the digital value converted by the A-D converter (ADC) 4, and a program for activating the serial communication module (SCM) 6 and starting the output process (serial transfer) are stored. The CPU 2, when the interruption controller (INTC) 7 generates an interruption, on the basis of the interruption factor indicated by it, executes any of the aforementioned programs.

The interruption controller (INTC) 7, when detecting that the first compare match signal 51 (CM1S), the second compare match signal 52 (CM2S), and the third compare match signal 53 (CM3S) by the timer 5, the A-D conversion completion signal (input process completion signal) 41 (ADE) by the A-D converter (ADC) 4, and the transfer completion signal 61 (TRE) by the serial communication module (SCM) 6 are outputted, stores outputting of each signal and when it is detected that each signal is outputted, outputs the interruption signal 71 (INT) according to the kind of the signal to the CPU 2.

Further, although not shown in the drawing, it is possible to install a register for selecting whether or not to generate an interruption for each input signal of the interruption controller (INTC) 7 when it is outputted and even if a certain signal is outputted, not to generate an interruption. By doing this, the unnecessary interruption process of the CPU 2 can be deleted.

Figure 2:
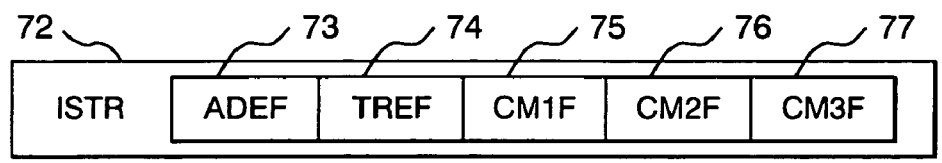
FIG. 2 is a drawing used for explanation of the interruption status register of the interruption controller of the first embodiment.

FIG. 2 shows an interruption status register (ISTR) 72 of the interruption controller (INTC) 7. The interruption status register (ISTR) 72, when the A-D conversion completion signal ADE (41) is outputted, sets an A-D conversion completion flag (ADER) 73, when the transfer completion signal TRE (61) is outputted, sets a transfer completion flag (TREF) 74, when the first compare match signal CM1S (51) is outputted, sets a first compare match flag (CM1F) 75, when the second compare match signal CM2S (52) is outputted, sets a second compare match flag (CM2F) 76, and when the third compare match signal CM3S (53) is outputted, sets a third compare match flag (CM3F) 77.

The interruption status register (ISTR) 72 can read and write data in the CPU 2. The CPU 2 reads the interruption status register (ISTR) 72 and can decide an interruption factor. Further, the CPU 2 writes 0 or 1 into each flag, thereby can clear the corresponding flag.

Figure 3:
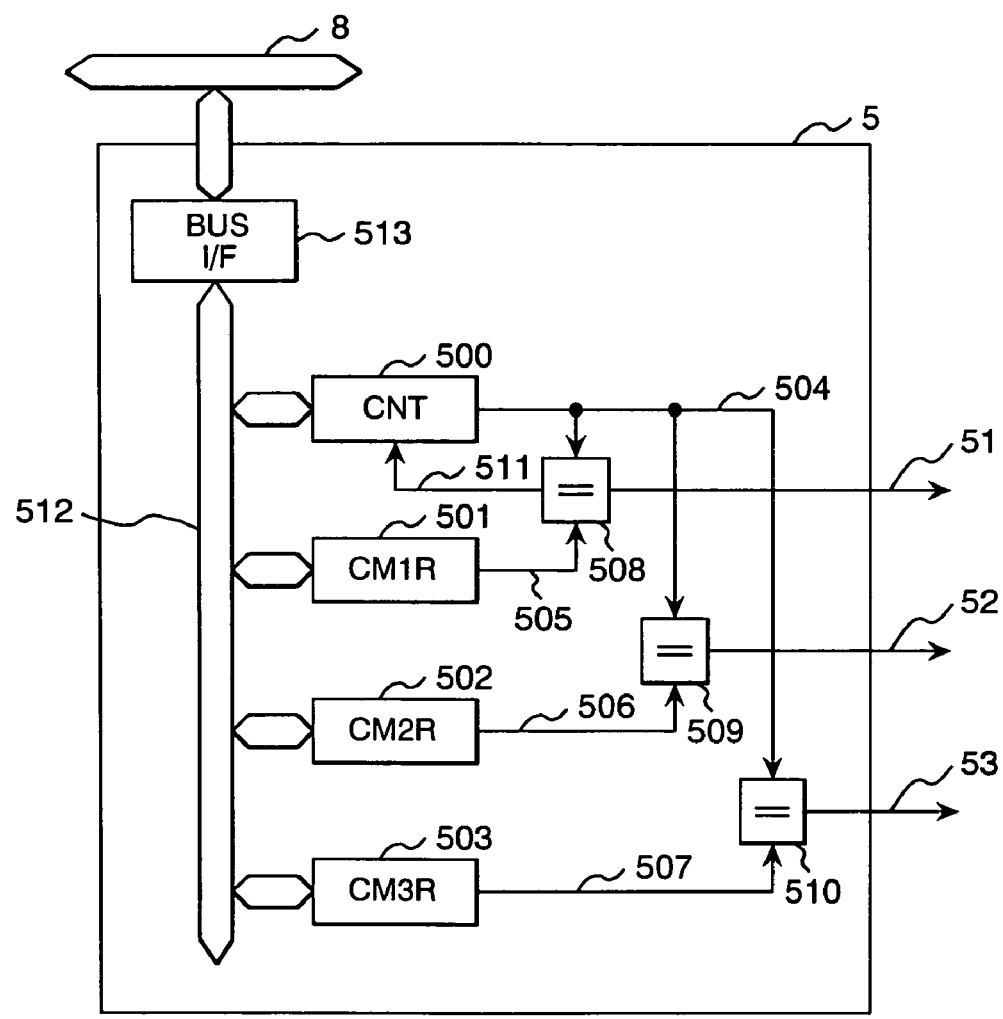
FIG. 3 is a block diagram of an example of the timer of the first embodiment.

FIG. 3 shows an example of the constitution of the timer 5.

The timer 5 in the drawn example has a-count register (CNT) 500, a first compare match register (CM1R) 501, a second compare match register (CM2R) 502, a third compare match register (CM3R) 503, and match detection circuits 508, 509, and 510. The count register (CNT) 500, the CM1R 501, the CM2R 502, and the CM3R 503 are connected to a module internal bus 512 and the module internal bus 512 is connected to the system bus 8 via a bus interface circuit 513. The CPU 2 reads and writes data in each register via the system bus 8, the bus interface circuit 513, and the module internal bus 512.

The count register (CNT) 500 is a counter for incrementing the count in a predetermined clock cycle and always outputs a count 504.

The CM1R 501, the CM2R 502, and the CM3R 503 are registers for setting counts for outputting the CM1S 51, the CM2S 52, and the CM3S 53.

The match detection circuit 508 compares the count 504 of the count register (CNT) 500 with the value of the CM1R 501 and when the two match with each other, it outputs the CM1S 51 and also outputs a CNT clear signal 511. The count register (CNT) 500, when the CNT clear signal 511 is outputted, returns the count to 0 and restarts counting.

The match detection circuit 509 compares the count 504 of the count register (CNT) 500 with the value of the CM2R 502 and when the two match with each other, it outputs the CM2S 52.

The match detection circuit 510 compares the count 504 of the count register (CNT) 500 with the value of the CM3R 503 and when the two match with each other, it outputs the CM3S 53.

Figure 4:
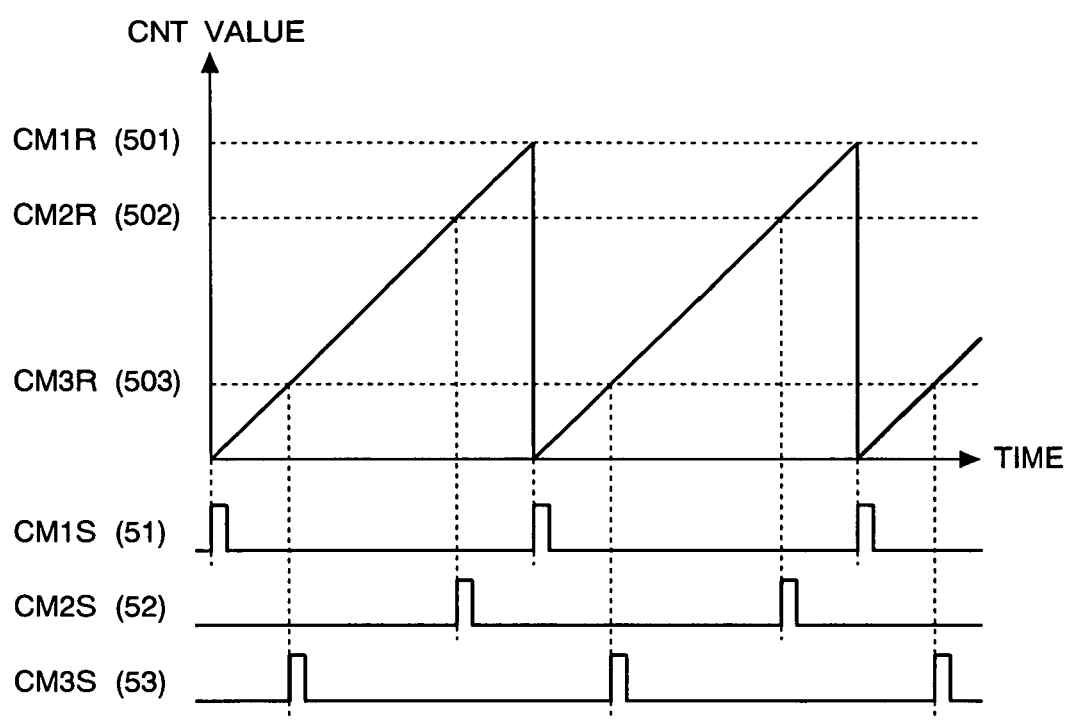
FIG. 4 is a time chart showing an operation example of the timer shown in FIG. 3.

FIG. 4 shows an operation example of the timer 5. The axis of abscissa of the graph indicates time and the axis of ordinate indicates a count.

The count of the count register (CNT) 500 increments from 0 in a predetermined clock cycle and when the count matches with the CM1R 501, it clears the count to 0 and repeats the increment again. It is desirable to make the repetitive time (interval) of counting equal to the control cycle.

The CM1S 51, CM2S 52, and CM3S 53 respectively output pulses when the counts match with the values of CM1R 501, CM2R 502, and CM3R 503. The time intervals of these signals are the same and the mutual time differences are always fixed.

Further, the timer 5 shown in FIG. 3 increments the count of the count register (CNT) 500 in a predetermined clock cycle. However, inversely to it, the timer 5 may decrement the count in a predetermined clock cycle. In this case, it is desirable to decrement the count of the count register (CNT) 500 in the predetermined clock cycle, when the count becomes 0, sets the value preset in the CM1R 501 in the count register (CNT) 500, and decrement the value again in the predetermined clock cycle.

Figure 5:
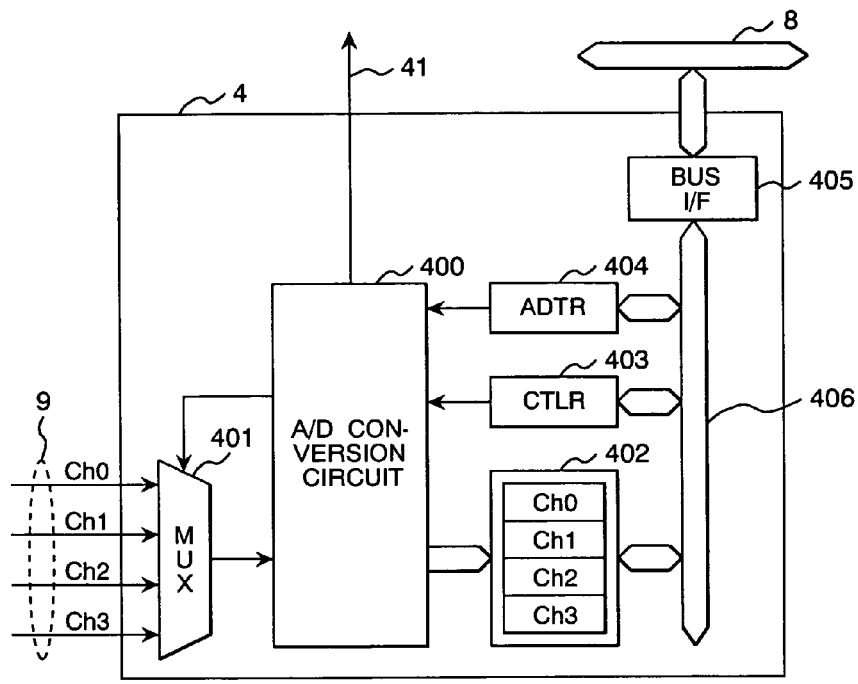
FIG. 5 is a block diagram of an example of the A-D converter of the first embodiment.

FIG. 5 shows the constitution of an example of the A-D converter (ADC) 4.

The A-D converter (ADC) 4 has an A-D conversion circuit 400, an analog multiplexer (MUX) 401 for selecting one of a plurality of analog inputs 9, a data buffer 402 for storing a converted digital value, a control register (CTLR) 403 for selecting an input channel for A-D conversion, and an A-D conversion start register (ADTR) 404 for starting the A-D conversion. The data buffer 402, CTLR 403, and ADTR 404 are connected to a module internal bus 406 and the module internal bus 406 is connected to the system bus 8 via a bus interface circuit 405. The CPU 2, via the system bus 8, the bus interface circuit 405, and the module internal bus 406, reads and writes data into the registers and data buffer.

The A-D conversion circuit 400, when the ADTR 404 is set, starts the A-D conversion on the basis of the setting of the CTLR 403.

The A-D conversion circuit 400 selects the input channel designated by the CTLR 403 by the MUX 401, reads the analog value, converts it to a digital value, and then stores it at a predetermined address of the data buffer 402. When converting a plurality of input channels, the A-D conversion circuit 400 sequentially switches one input channel by the MUX 401 and converts it to a digital value.

Further, the A-D conversion circuit 400, when the A-D conversion of input channels designated by the CTLR 403 is all completed, clears the ADTR 404 to 0 and outputs the A-D conversion completion signal (ADE) 41.

Figure 6:
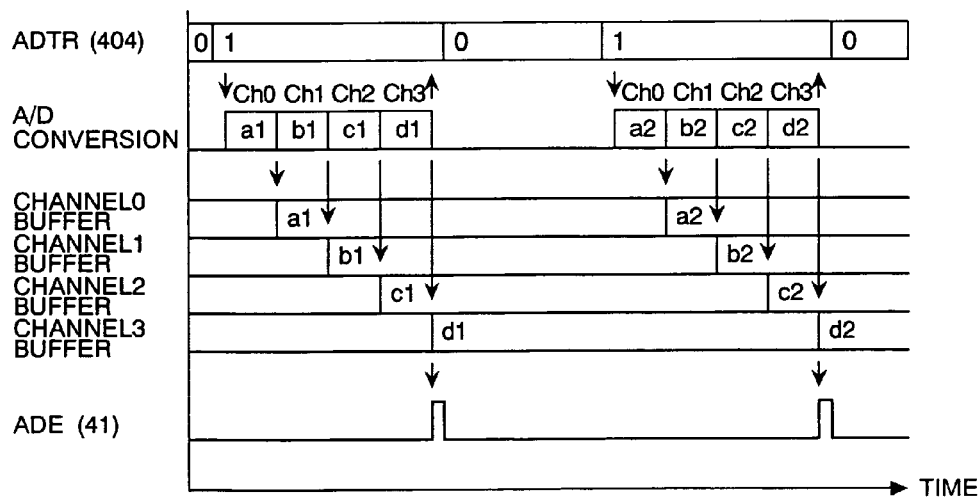
FIG. 6 is a time chart showing an operation example of the A-D converter shown in FIG. 5.

FIG. 6 shows an operation example of the A-D converter (ADC) 4. This operation example shows conversion of four input channels and the axis of abscissa of the graph indicates time.

Firstly, when the CPU 2 sets the ADTR 404 to 1, the A-D conversion circuit 400 reads the analog values in the order of the input channels 0, 1, 2, and 3, converts them to digital values, and stores the digital values at a predetermined address of the data buffer 402. When the A-D conversion of all the channels is completed, the A-D conversion circuit 400 clears the ADTR 404 to 0 and outputs the A-D conversion completion signal (ADE) 41. The interruption controller (INTC) 7 detects the output of the ADE 41 and outputs the interruption signal (INT) 71, so that the CPU 2 can detect completion of the A-D conversion.

Figure 7:
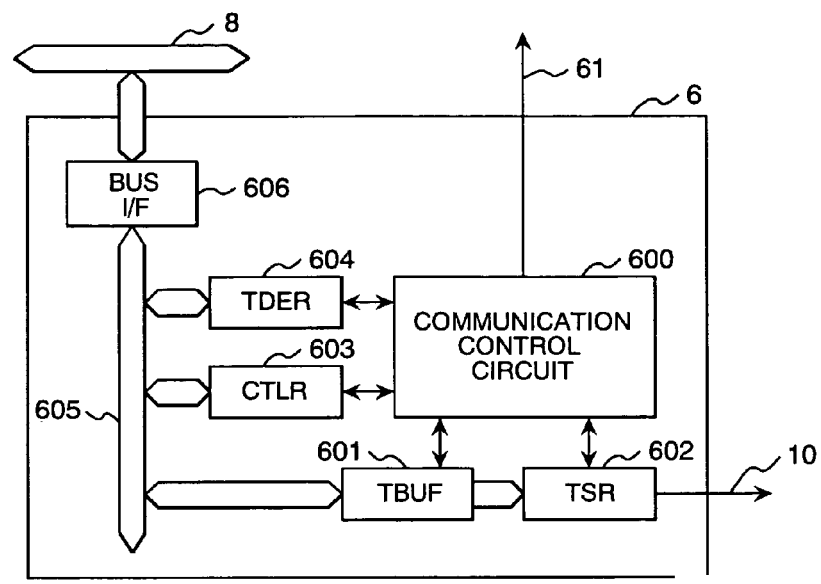
FIG. 7 is a block diagram of an example of the serial communication module of the first embodiment.

FIG. 7 shows the constitution of an example of the serial communication module (SCM) 6.

The serial communication module (SCM) 6 has a communication control circuit 600, a transmission buffer (TBUF) 601 for storing data to be transmitted, a transmission shift register (TSR) 602 for serial transmission, a control register (CTLR) 603, and a transmission buffer empty flag register (TDER) 604. Further, the components relating to reception of the serial communication are omitted.

The TBUF 601, CTLR 603, and TDER 604 are connected to a module internal bus 605 and the module internal bus 605 is connected to the system bus 8 via a bus interface circuit 606. The CPU 2, via the system bus 8, the bus interface circuit 606, and the module internal bus 605, reads and writes data into the registers and data buffer.

The TDER 604 indicates that transfer data is not stored in the TBUF 601 or stored data is all transferred to the TSR 602 and the TBUF 601 is empty. The TDER 604 is set at 1 in the initial state and the value is cleared to 0 by writing by the CPU 2.

The communication control circuit 600, when the TDER 604 is cleared to 0, considers that transfer data is stored in the TBUF 601, sets the data of the TBUF 601 in the TSR 602, and starts data transmission via the serial transmission path 10. Therefore, it is desirable for the CPU 2 to write the transfer data into the TBUF 601 and then clear the TDER 604 to 0.

Further, the communication control circuit 600, when the data of the TBUF 601 is all set in the TSR 602 and the TBUF 601 becomes empty, sets the TDER 604 to 1. Furthermore, when the data transmission via the serial transmission path 10 is completed, the communication control circuit 600 outputs the data transmission completion signal (TRE) 61.

Figure 8:
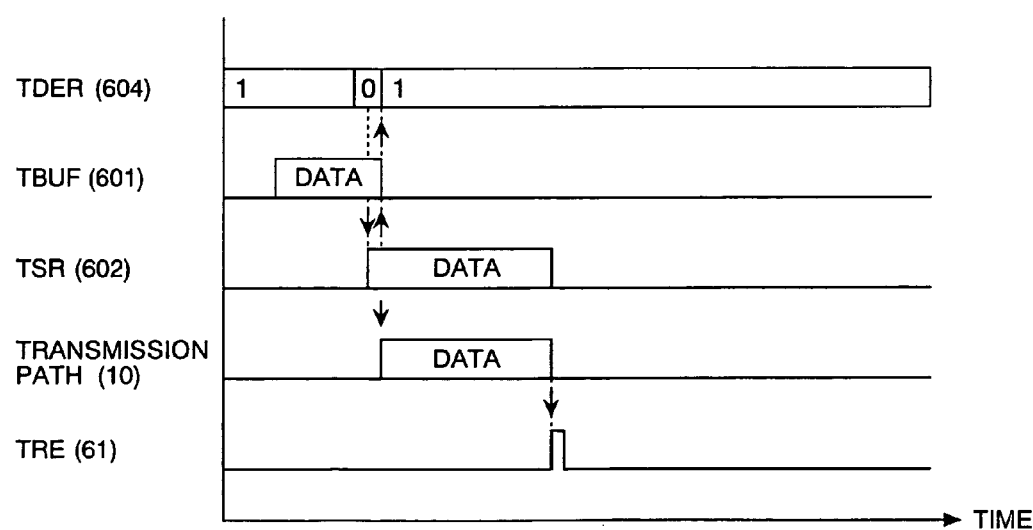
FIG. 8 is a time chart showing an operation example of the serial communication module shown in FIG. 7.

FIG. 8 shows an operation example of the serial communication module (SCM) 6. The axis of abscissa of the graph indicates time.

Firstly, the CPU 2 writes data into the TBUF 601 and then clears the TDER 604 to 0.

The communication control circuit 600, when the TDER 604 is cleared to 0, sets the data written in the TBUF 601 in the TSR 602 and starts data transmission via the serial transmission path 10. When the data of the TBUF 601 is all set in the TSR 602, the communication control circuit 600 sets the TDER 604 to 1. Furthermore, when the data transmission is completed, the communication control circuit 600 outputs the TRE 61. When the TRE 61 is outputted, the interruption controller (INTC) 7 outputs the interruption signal (INT) 71, so that the CPU 2 can detect the completion of the data transmission.

In this embodiment, by an interruption of the interruption controller (INTC) 7, the CPU 2 starts A-D conversion of the A-D converter (ADC) 4, starts operations, and starts data transmission of the serial communication module (SCM) 6. These operations are performed during the interruption process executed by the CPU 2.

Figure 9:
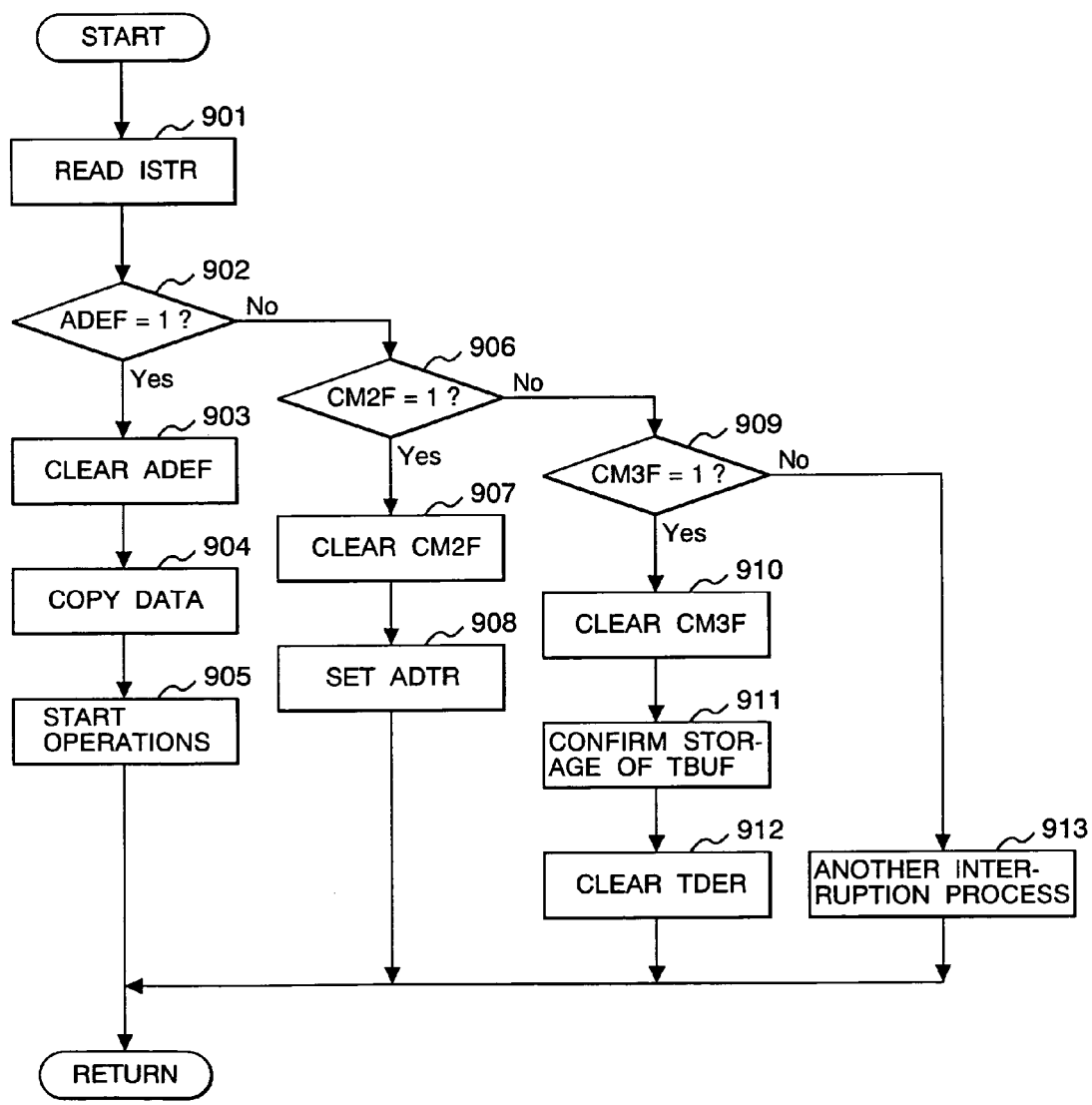
FIG. 9 is a flow chart showing an example of the interruption process of the first embodiment.

FIG. 9 shows an example of the interruption process. In this example, by an interruption by output of the CM2S 52 of the timer 5, the A-D conversion is started, and by an interruption by output of the ADE 41 of the A-D converter (ADC) 4, the operation is started, and by an interruption by output of the CM3S 53 of the timer 5, the data transmission is started.

When the interruption controller (INTC) 7 outputs the INT 71, the CPU 2 detects the output of the INT 71 and starts the interruption process.

Firstly, the CPU 2 reads the interruption status register (ISTR) 72 (Step 901) and decides whether the ADER 73, CM2F 76, and CM3F 77 are set at 1 or not (Steps 902, 906, 909).

When the ADER 73 is set at 1, the CPU 2 clears the ADEF 73 (Step 903), copies the data of the data buffer 402 of the A-D converter (ADC) 4 into the memory 3 (Step 904), and starts the operation (Step 905).

When the CM2F 76 is set at 1, the CPU 2 clears the CM2F 76 (Step 907), sets the ADTR 404, and starts the A-D conversion of the A-D converter (ADC) 4 (Step 908).

When the CM3F 77 is set at 1, the CPU 2 clears the CM3F 77 (Step 910), confirms whether the transmission data is stored in the TBUF 601 of the serial communication module (SCM) 6 or not (Step 911), and when the transmission data is stored, clears the TDER 604 and starts the data transmission of the serial communication module (SCM) 6 (Step 912). Further, when the transmission data is not stored in the TBUF 601 at the time of the interruption process, the CPU 2 continues the operation, stores the transmission data in the TBUF 601, then clears the TDER 604, and starts the data transmission.

When an interruption flag other than the aforementioned is set at 1, the CPU 2 executes a predetermined process corresponding to it (Step 913).

Figure 10:
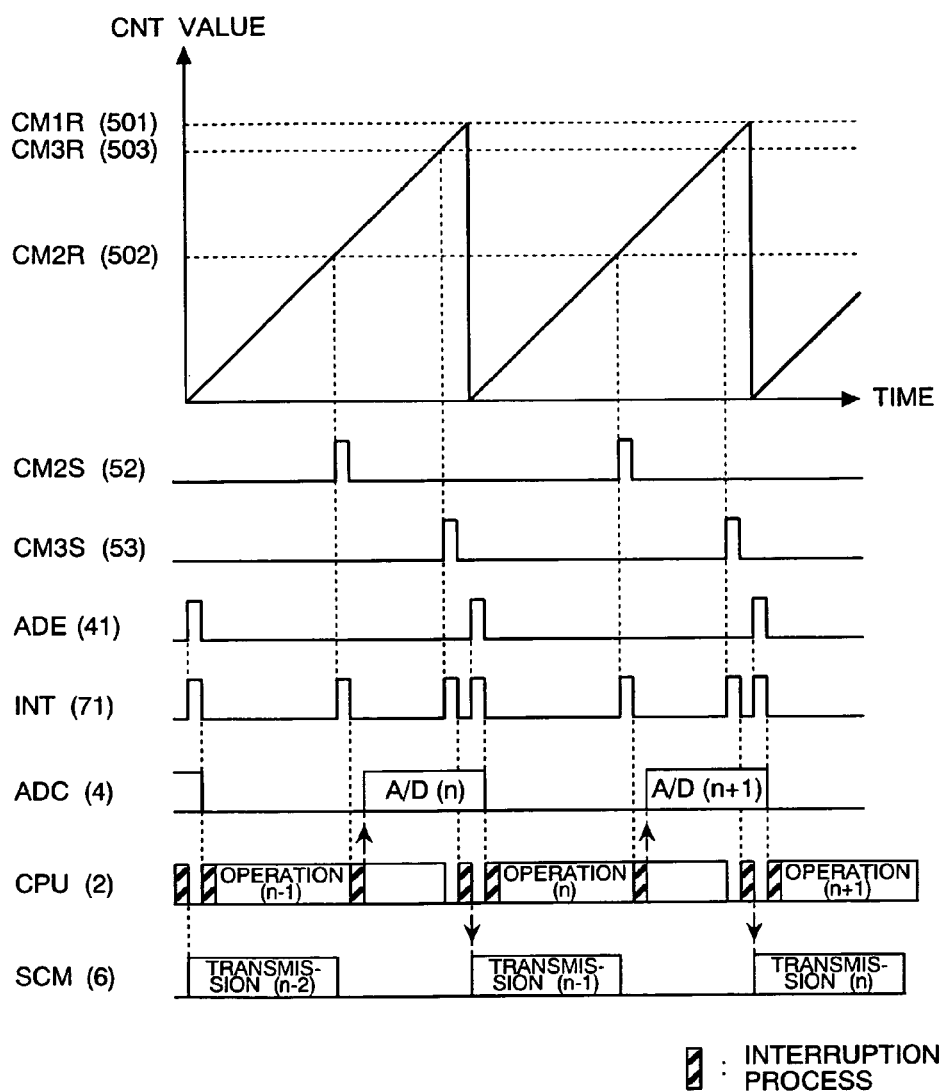
FIG. 10 is a time chart used for explanation of an operation example of the electronic controller of the first embodiment.
Figure 11:
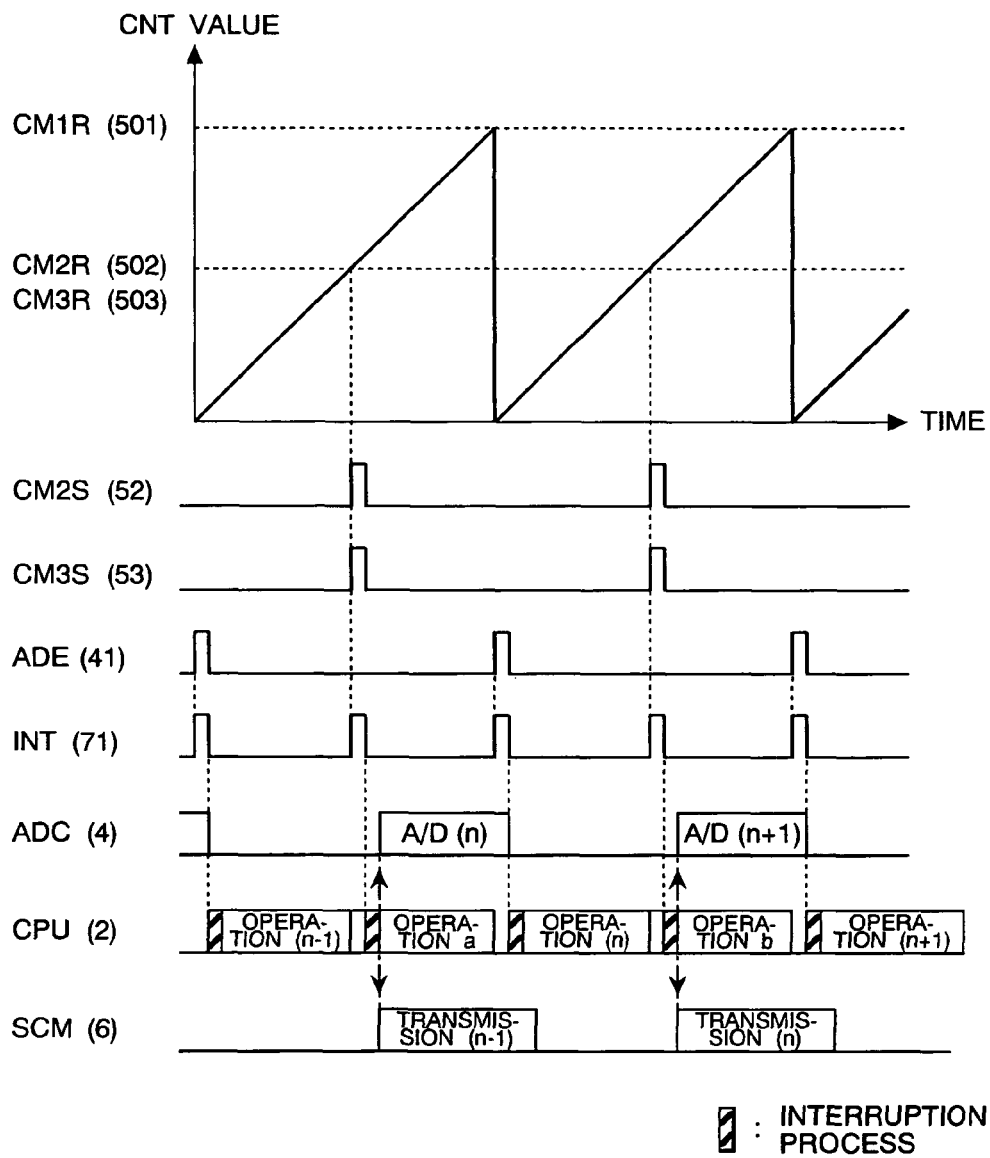
FIG. 11 is a time chart used for explanation of another operation example of the electronic controller of the first embodiment.

FIGS. 10 and 11 show operation examples of the interruption process.

In the operation example shown in FIG. 10, the CM3R 503 is set so that the data transmission of the serial communication module (SCM) 6 is started immediately after completion of the operation of the CPU 2.

When the count of the count register (CNT) 500 of the timer 5 matches with the CM2R 502, the timer 5 outputs the CM2S 52 and the interruption controller (INTC) 7 detects it and outputs the INT 71. When the CPU 2 detects the output of the INT 71, it starts the A-D conversion of the A-D converter (ADC) 4 by the interruption process.

Further, the A-D converter (ADC) 4, when the A-D conversion is completed, outputs the ADE 41 and the interruption controller (INTC) 7 detects it and outputs the INT 71. When the CPU 2 detects the output of the INT 71, it starts the operation.

Further, when the count of the counter register (CNT) 500 of the timer 5 matches with the CM3R 503, the timer 5 outputs the CM3S 53 and the interruption controller (INTC) 7 detects it and outputs the INT 71. When the CPU 2 detects the output of the INT 71, it starts the data transmission of the serial communication module (SCM) 6 by the interruption process.

In this operation example, the A-D conversion of the A-D converter (ADC) 4, the operation of the CPU 2, and the data transmission of the serial communication module (SCM) 6 are executed in parallel, so that the control cycle can be shortened and the response time from the A-D conversion (input process) to the data transmission (output process) can be shortened.

On the other hand, in the operation example shown in FIG. 11, the CM2R 502 and CM3R 503 are set at the same value so that immediately after completion of the operation of the CPU 2, the data transmission of the serial communication module (SCM) 6 is started and the next A-D conversion of the A-D converter ADC 4 is started.

When the count of the count register (CNT) 500 of the timer 5 matches with the CM2R 502 and the CM3R 503, the timer 5 outputs the CM2S 52 and CM3S 53 and the interruption controller (INTC) 7 detects it and outputs the INT 71. When the CPU 2 detects the output of the INT 71, it starts the A-D conversion of the ADC 4 by the interruption process and starts the data transmission of the SCM 6. Further, the order of start of the A-D conversion and start of the data transmission is predetermined.

Further, the A-D converter (ADC) 4, when the A-D conversion is completed, outputs the ADE 41 and the interruption controller (INTC) 7 detects it and outputs the INT 71. When the CPU 2 detects the output of the INT 71, it starts the operation.

In this operation example, the CM2S 52 and CM3S 53 are outputted. However, using either of the CM2R 502 and CM3R 503, either of the CM2S 52 and CM3S 53 may be outputted. In this case, the CPU 2, by the interruption process, may start the A-D conversion of the ADC 4 and the data transmission of the SCM 6 in a predetermined order.

Also in this example, the A-D conversion of the ADC 4, the operation of the CPU 2, and the data transmission of the SCM 6 are executed in parallel, so that the control cycle can be shortened and the response time from the A-D conversion (input process) to the data transmission (output process) can be shortened.

Further, as indicated in this operation example, during execution of the A-D conversion and data transfer, the CPU 2 can execute another process (process a or process b).

Figure 12:
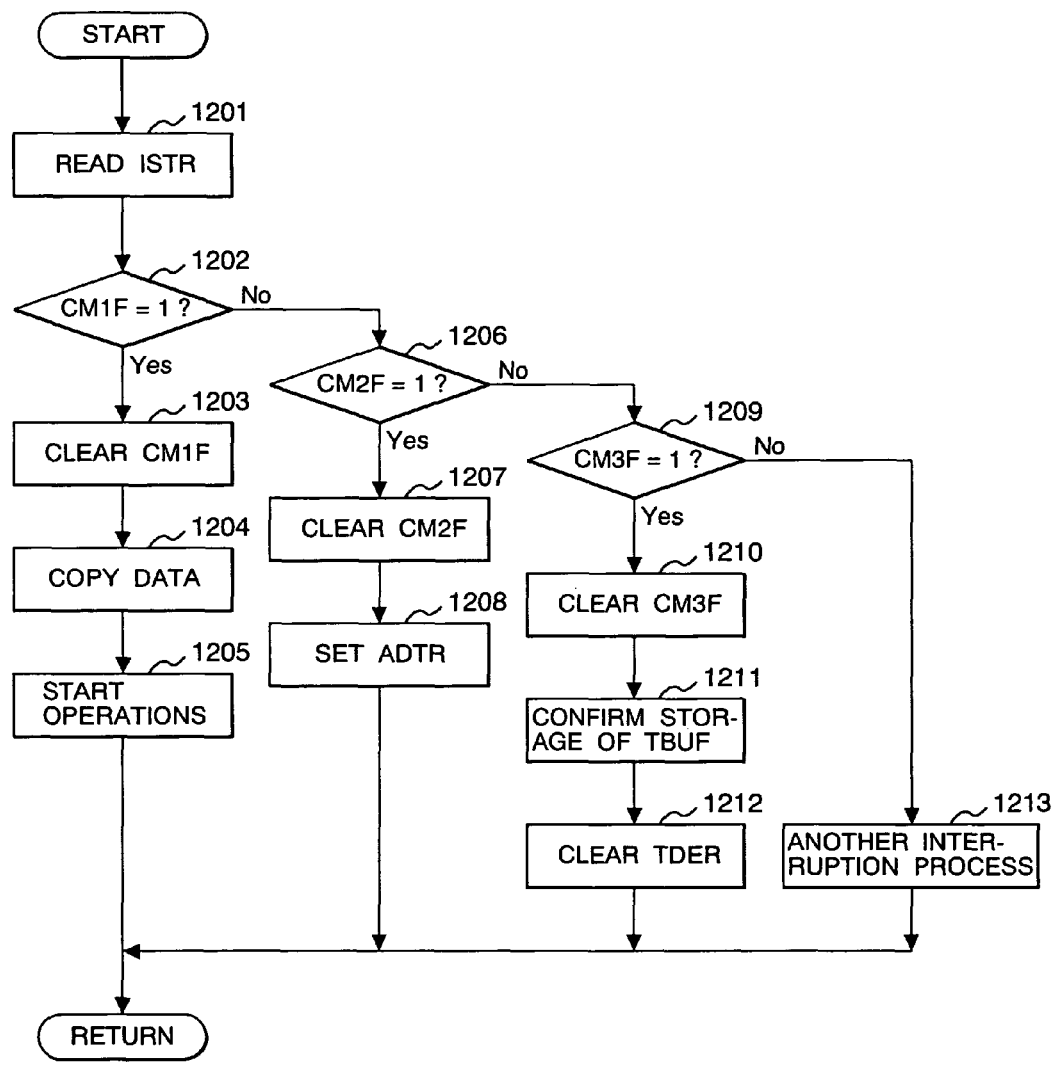
FIG. 12 is a flow chart showing another example of the interruption process of the first embodiment.

FIG. 12 shows another example of the interruption process. This example is basically the same as the example of the interruption process shown in FIG. 9, though the respect that the operation is started by an interruption by the output of the CM1S 51 of the timer 5 is different.

When the interruption controller (INTC) 7 outputs the INT 71, the CPU 2 detects the output of the INT 71 and starts the interruption process.

The CPU 2 firstly reads the interruption status register (ISTR) 72 (Step 1201) and decides whether the CM1F 75, CM2F 76, and CM3F 77 are set at 1 or not (Steps 1202, 1206, 1209). When the CM1F 75 is set at 1, the CPU 2 clears the CM1F 75 (Step 1203), copies the data of the data buffer 402 of the A-D converter (ADC) 4 into the memory 3 (Step 1204), and starts the operation (Step 1205).

When the CM2F 76 is set at 1, the CPU 2 clears the CM2F 76 (Step 1207), sets the ADTR 404, and starts the A-D conversion of the ADC 4 (Step 1208).

When the CM3F 77 is set at 1, the CPU 2 clears the CM3F 77 (Step 1210), confirms whether the transmission data is stored in the TBUF 601 of the SCM 6 or not (Step 1211), and when the transmission data is stored, clears the TDER 604 and starts the data transmission of the SCM 6 (Step 1212). Further, when the transmission data is not stored in the TBUF 601 at the time of the interruption process, the CPU 2 continues the operation, stores the transmission data in the TBUF 601, then clears the TDER 604, and starts the data transmission.

When an interruption flag other than the aforementioned is set at 1, the CPU 2 executes a predetermined process corresponding to it (Step 1213).

Figure 13:
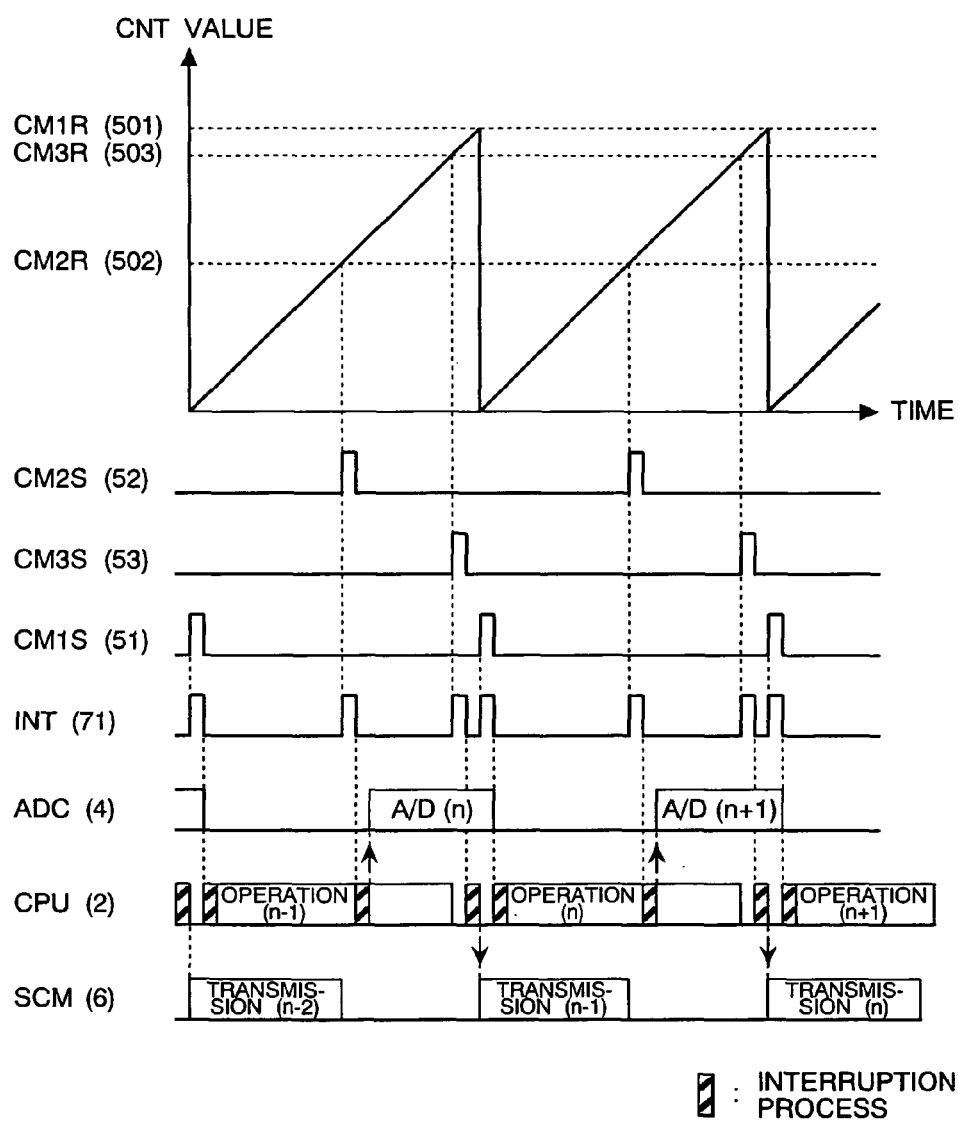
FIG. 13 is a time chart used for explanation of still another operation example of the electronic controller of the first embodiment.

FIG. 13 shows another operation example of the interruption process. This operation example is basically the same as the operation example shown in FIG. 10, though the respect that by an interruption generated by the CM1S 51 instead of the interruption generated by the output of the ADE 41, the CPU 2 starts the operation is different.

In FIG. 13, the CM1R 501 is set so that the operation of the CPU 2 is started immediately after completion of the A-D conversion of the A-D converter (ADC) 4 and the CM3R 503 is set so that the data transmission of the serial communication module (SCM) 6 is started immediately after completion of the operation of the CPU 2.

When the count of the count register (CNT) 500 of the timer 5 matches with the CM2R 502, the timer 5 outputs the CM2S 52 and the interruption controller (INTC) 7 detects it and outputs the INT 71. When the CPU 2 detects the output of the INT 71, it starts the A-D conversion of the A-D converter (ADC) 4 by the interruption process.

Further, when the count of the counter register (CNT) 500 of the timer 5 matches with the CM1R 501, the timer 5 outputs the CM1S 51 and the interruption controller (INTC) 7 detects it and outputs the INT 71. When the CPU 2 detects the output of the INT 71, it starts the operation.

Further, when the count of the counter register (CNT) 500 of the timer 5 matches with the CM3R 503, the timer 5 outputs the CM3S 53 and the interruption controller (INTC) 7 detects it and outputs the INT 71. When the CPU 2 detects the output of the INT 71, it starts the data transmission of the serial communication module (SCM) 6 by the interruption process.

Also in this example, similarly to the operation example shown in FIG. 10, the A-D conversion of the A-D converter (ADC) 4, the operation of the CPU 2, and the data transmission of the serial communication module (SCM) 6 are executed in parallel, so that the control cycle can be shortened and the response time from the A-D conversion (input process) to the data transmission (output process) can be shortened.

Further, when the ADE 41 and CM1S 51 are replaced with each other, the same operation as that of the example shown in FIG. 11 can be performed.

In the first embodiment described above, by the interruption process of the CPU 2, the A-D conversion of the A-D converter (ADC) 4 is started, and the data transmission of the serial communication module (SCM) 6 is started, and the operation is started. However, instead of the interruption process, when the CPU 2 polls the interruption status register (ISTR) 72 of the interruption controller (INTC) 7 and the ADEF 72, CM1F 75, CM2F 76, and CM3F 77 are respectively set to 1, it is possible to start the A-D conversion of the A-D converter (ADC) 4, start the data transmission of the serial communication module (SCM) 6, and start the operation.

Further, in the electronic controller 1A of this embodiment, the start timing of the A-D conversion of the A-D converter (ADC) 4 can be changed. For example, by the n-th operation by the CPU 2, the start timing of the "n+1"-th A-D conversion or the "n+2"-th and subsequent A-D conversion is decided, and the CM2R 502 of the timer 5 is reset, thus an analog signal can be fetched at desired timing. Similarly, when the CM3R 503 of the timer 5 is reset, the data transfer of the serial communication module (SCM) 6 can be started at desired timing.

Second Embodiment

Figure 14:
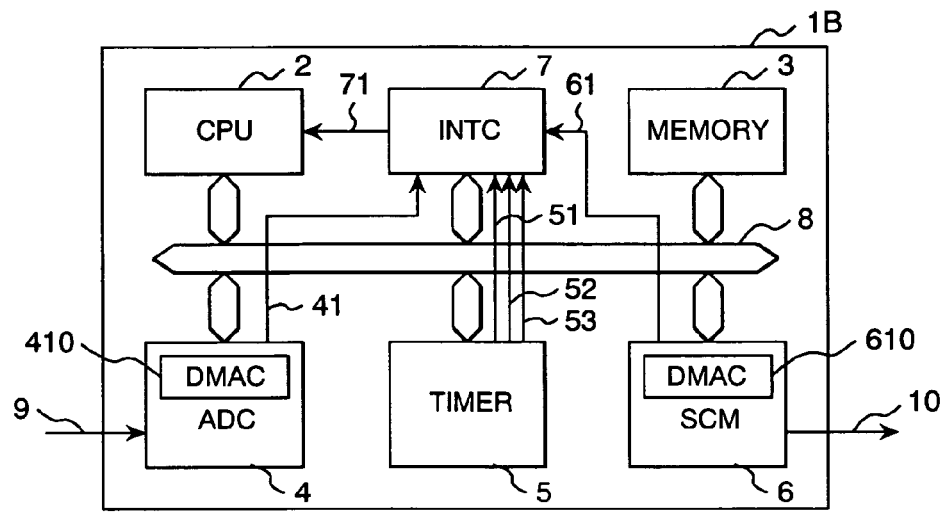
FIG. 14 is a schematic block diagram showing the second embodiment of the electronic controller relating to the present invention.

FIG. 14 is a schematic block diagram of the second embodiment of the electronic controller relating to the present invention.

An electronic controller 1B of the second embodiment shown in the drawing is basically the same as the electronic controller 1A of the first embodiment shown in FIG. 1, though the respect that the A-D converter (ADC) 4 and the serial communication module (SCM) 6 respectively have dynamic memory access controllers (DMAC) 410 and 610 is different. The DMAC 410 has a function for transferring data converted by the A-D converter (ADC) 4 to the memory 3. Further, the DMAC 610 has a function for transferring data of the memory 3 to the serial communication module (SCM) 6 and starting the data transmission of the SCM. Here, the data transfer by the DMACs 410 and 610 is called DMA transfer.

Figure 15:
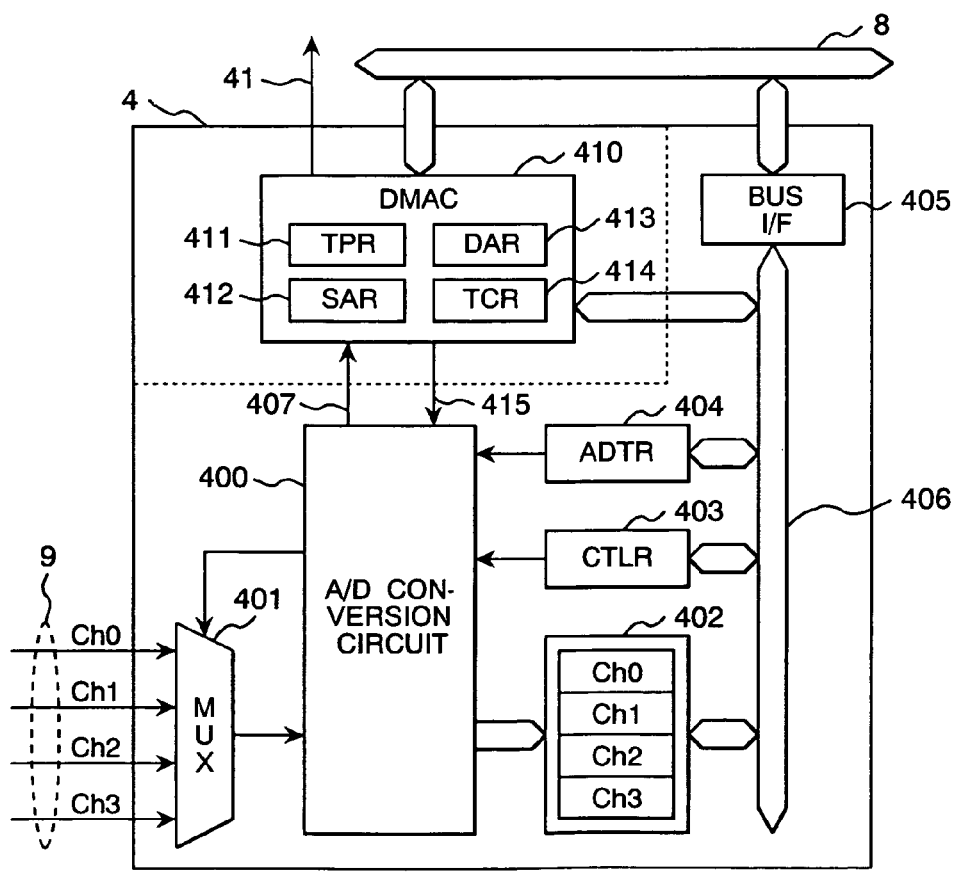
FIG. 15 is a block diagram of the A-D converter of the second embodiment.

FIG. 15 shows a block diagram of an example of the A-D converter (ADC) 4 shown in FIG. 14. The ADC 4 in this example is basically the same as that shown in FIG. 5, though the respect that the ADC 4 has the dynamic memory access controller (DMAC) 410 is different. Further, the DMAC 410 may be a module independent of the A-D converter (ADC) 4.

The DMAC 410 has a transfer pending flag register (TPR) 411, a transfer source address register (SAR) 412, a transfer destination address register (DAR) 413, and a transfer count register (TCR) 414.

The TPR 411 is in a zero-clear state first and when the DMA transfer is completed, it is set to 1. Thereafter, until this register is cleared to 0, the DMA transfer is not executed and is kept in a pending state.

The A-D conversion circuit 400, when the A-D conversion is completed, ascertains a DMA transfer request signal (DREQ) 407.

The DMAC 410, when the TPR 411 is in the 0-clear state and the DREQ 407 is in the ascert state, outputs a DMA transfer reception signal (DRAK) 415 to the A-D conversion circuit 400 and starts the DMA transfer. And, when the DMA transfer of the count set in the TCR 414 is completed, the DMAC 410 sets the TPR 411 to 1 and outputs the A-D conversion completion signal (ADE) 41.

On the other hand, the A-D conversion circuit 400, when the DRAK 415 is outputted, negates the DREQ 407.

In the DMA transfer by the DMAC 410, the DMAC 410 reads data from the address set in the SAR 412 and writes it at the address designated by the DAR 413. Further, when a transfer count of 2 times or more is set in the TCR 414, while increasing the addresses set in the SAR 412 every DMA transfer, the DMAC 410 reads data and while increasing the addresses set in the DAR 413, writes data. Therefore, it is desirable to set the top address of the data to be transferred by the data buffer 402 of the A-D converter (ADC) 4 in the DAR 413, to set the top address of a predetermined area of the memory 3 for storing the converted data in the DAR 413, and to set the number of data to be transferred in the TCR 414. Further, after execution of the DMA transfer by the set count in the TCR 414, it is desirable to automatically reload the original top addresses into the SAR 412 and DAR 413.

Figure 16:
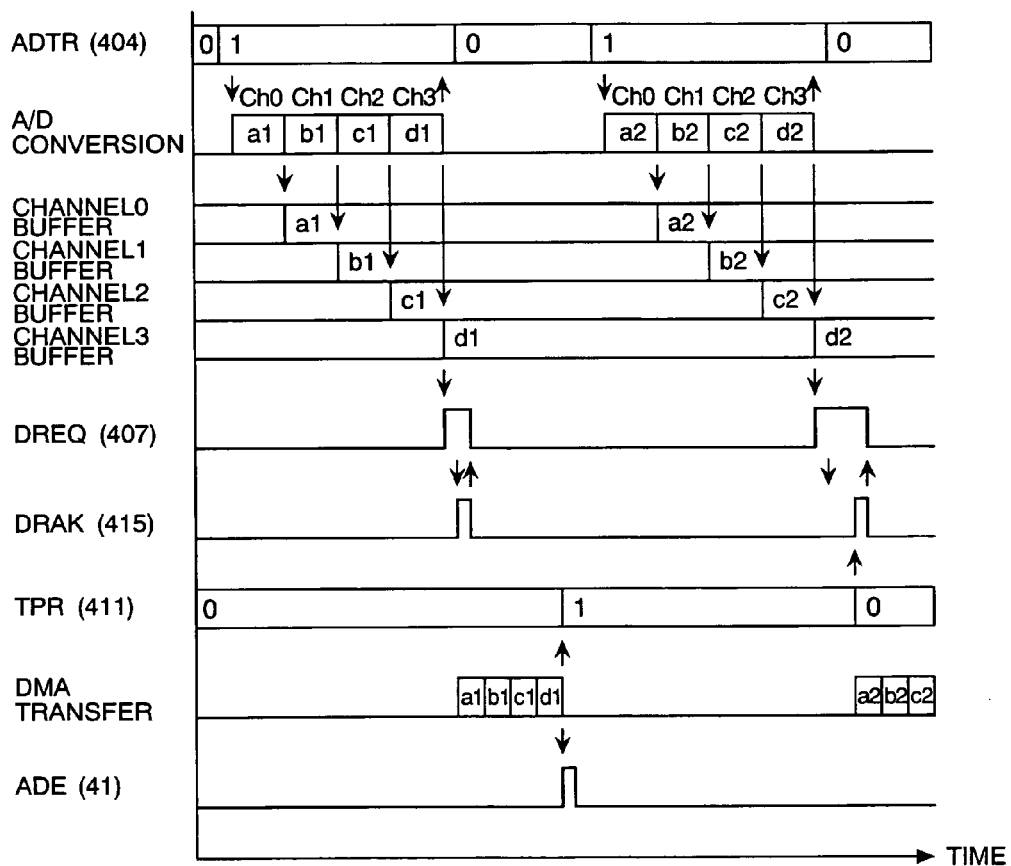
FIG. 16 is a time chart showing an operation example of the A-D converter shown in FIG. 15.

FIG. 16 shows an operation example of the A-D converter (ADC) 4 mentioned above. This operation example indicates conversion of four input channels and the axis of abscissa of the graph indicates time.

Firstly, when the ADTR 404 is set to 1 by the CPU 2, the A-D conversion circuit 400 reads analog values in the order of the input channels 0, 1, 2, and 3, converts them to digital values, and stores the digital values at a predetermined address of the data buffer 402.

When the A-D conversion of all the channels is completed, the A-D conversion circuit 400 clears the ADTR 404 to 0 and ascertains the DREQ 407.

The DMAC 410, when the DREQ 407 is ascertained, outputs the DRAK 415 and starts the DMA transfer. And, when the DMA transfer is completed, the DMAC 410 sets the TPR 411 to 1 and outputs the A-D conversion completion signal (ADE) 41. When the ADE 41 is outputted, the interruption controller (INTC) 7 outputs the interruption signal (INT) 71, so that the CPU 2 can detect completion of the A-D conversion and DMA transfer.

On the other hand, the A-D conversion circuit 400, when the DRAK 415 is outputted, negates the DREQ 407.

In the second A-D conversion, the A-D conversion circuit 400 ascertains the DREQ 407 after completion of the A-D conversion. However, since the TPR 411 is set at 1, the DMAC 410 does not start the DMA transfer and enters the transfer pending state. Thereafter, when the TPR 411 is cleared to 0 by the CPU 2, the DMAC 410 starts the DMA transfer.

Further, in this example, the DMAC 410 can put the DMA transfer into the pending state using the TPR 411. However, without using the TPR 411, it is possible to start the DMA transfer when the A-D conversion circuit ascertains the DREQ 407.

Figure 17:
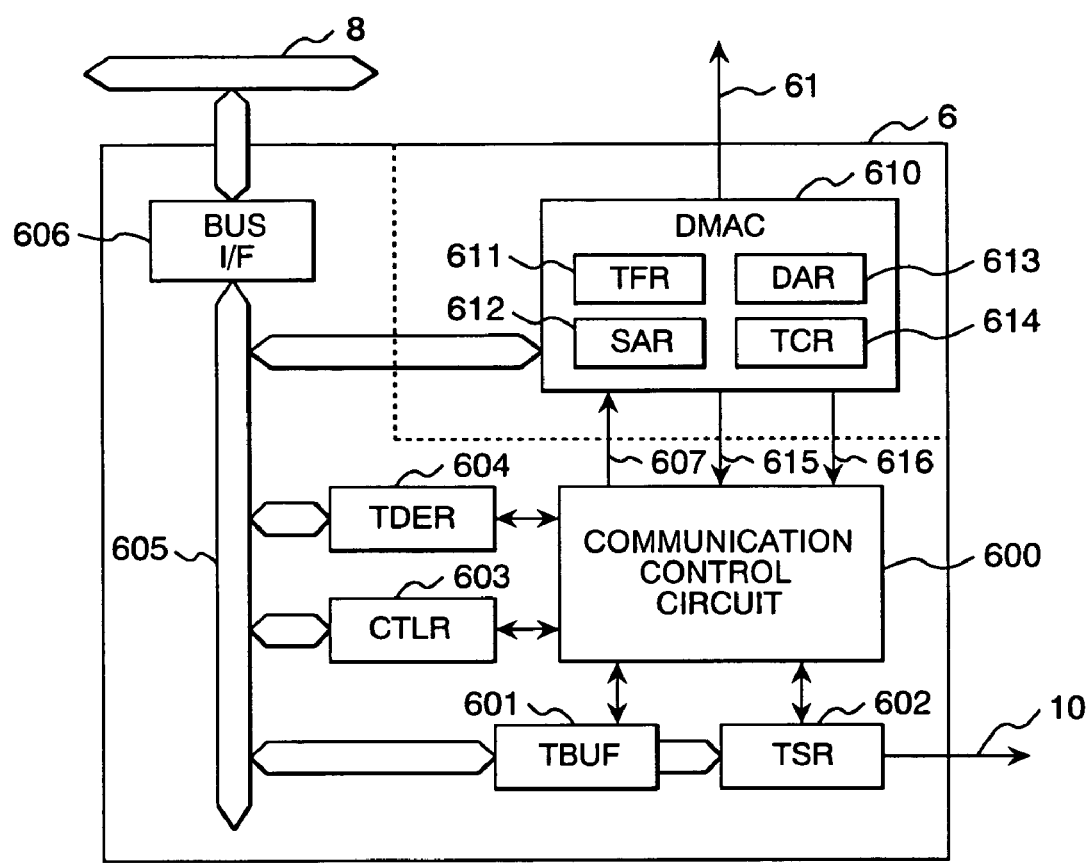
FIG. 17 is a block diagram of the serial communication module of the second embodiment.

FIG. 17 shows a block diagram of the serial communication module (SCM) 6 shown in FIG. 14. The difference from the one shown in FIG. 7 is that the module has the dynamic memory access controller (DMAC) 610. Further, the DMAC 610 may be independent of the serial communication module (SCM) 6. Further, the components relating to reception of the serial communication are omitted.

The DMAC 610 has a function for transferring data of the memory 3 to the serial communication module (SCM) 6 and starting the data transmission by the serial communication module (SCM) 6. The DMAC 610 has a transfer flag register (TFR) 611, a transfer source address register (SAR) 612, a transfer destination address register (DAR) 613, and a transfer count register (TCR) 614. The TFR 611, SAR 612, DAR 613, and TCR 614 can be read and written by the CPU 2.

The TFR 611 is firstly set in the 0-clear state and when it is set to 1 by the CPU 2, the DMA transfer is started. Thereafter, when the DMA transfer is completed, the TFR 611 is set to 0.

The communication control circuit 600, when the TBUF 601 is empty, ascertains a DMA transfer request signal (DREQ) 607.

The DMAC 610, when the TFR 611 is in the 1-set state and the DREQ 607 is in the ascertainment state, outputs a DMA transfer reception signal (DRAK) 615 to the communication control circuit 600 and starts one DMA transfer. And, when one DMA transfer is completed, the DMAC 610 outputs a DMA transfer completion signal (DACK) 616. The DMA transfer operation is repeated by the count set in the TCR 614 and when the final DMA transfer is completed, the DMAC 610 outputs the data transmission completion signal (TRE) 61.

On the other hand, the communication control circuit 600, when the DRAK 615 is outputted, negates the DREQ 607 and when the DACK 616 is outputted, clears the TDER 604 to 0. And, the communication control circuit 600 sets the data transferred to the TBUF 601 in a TSR 602, starts the data transmission via the serial transmission path 10, sets the TDER 604 to 1 again, and ascertains the DREQ 607.

In the DMA transfer by the DMAC 610, the DMAC 610 reads data from the address set in the SAR 612 and writes it into the address designated by the DAR 613. Further, when a transfer count of 2 times or more is set in the TCR 614, while increasing the addresses set in the SAR 612 every DMA transfer, the DMAC 610 reads data and writes it into the address designated by the DAR 613. Therefore, it is desirable to set the top address of the data to be transferred, which is stored in the memory 3, in the SAR 612, to set the address of the TBUF 601 in the DAR 613, and to set the number of data to be transferred in the TCR 614. Further, after execution of the DMA transfer by the set count in the TCR 614, it is desirable to automatically reload the original top address into the SAR 612.

Figure 18:
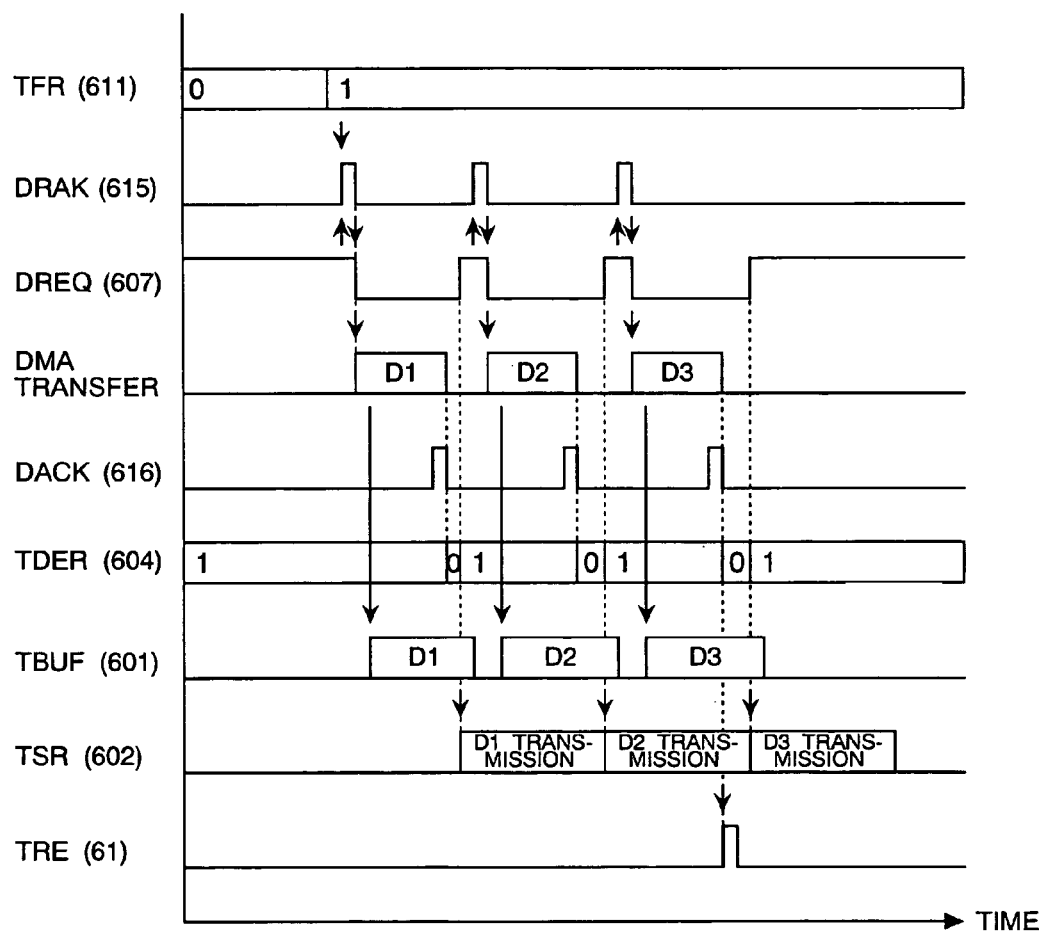
FIG. 18 is a time chart showing an operation example of the serial communication module shown in FIG. 17.

FIG. 18 shows an operation example of the serial communication module (SCM) 6. In this operation example, the data transfer count is set at 3. Further, the axis of abscissa of the graph indicates time.

Firstly, when the TFR 611 is set to 1 by the CPU 2, the DMAC 610 detects ascertainment of the DREQ 607, outputs the DRAK 615, and starts the first DMA transfer. And, when the first DMA transfer is completed, the DMAC 610 outputs the DACK 616.

On the other hand, the communication control circuit 600, when the DRAK 615 is outputted, negates the DREQ 607 and when the DACK 616 is outputted, clears the TDER 604 to 0. And, the communication control circuit 600 sets the data transferred to the TBUF 601 in the TSR 602, starts the data transmission via the serial transmission path 10, sets the TDER 604 to 1 again, and ascertains the DREQ 607 for the next DMA transfer.

Next, the DMAC 610 detects ascertainment of the DREQ 607, outputs the DRAK 615, increases the addresses of the SAR 612, and starts the second DMA transfer. The subsequent operation is the same as that of the first DMA transfer.

Furthermore, when the third DMA transfer is completed, the DMAC 610 outputs the TRE 61. When the TRE 61 is outputted, the interruption controller (INTC) 7 outputs the interruption signal (INT) 71, so that the CPU 2 can detect DMA transfer completion for data transmission.

Further, in this example, when the final DMA transfer is completed, the DMAC 610 outputs the TRE 61. However, for example, it is possible to notify transmission completion to the DMAC 610 from the communication control circuit 600 every completion of the serial transmission and when the DMAC 610 counts the number of transmission completion notifications and receives the notifications by the same count as that of the TCR 614, that is, when the final serial transmission is completed, to output the TRE 61. Or, it is possible to prepare a register for notifying the number of transmission data to the communication control circuit 600 and when the count of serial transmission completion becomes equal to the register value, to output the TRE 61 by the communication control circuit 600.

Further, in this example, the communication control circuit 600 detects that the DMAC 610 outputs the DACK 616 and starts the data transmission, so that there is no need to clear the TDER 604 to 0 by the CPU 2 and only by setting the TFR 611 to 1 by the CPU 2, both data writing into the TBUF 601 and serial transmission are executed.

Figure 19:
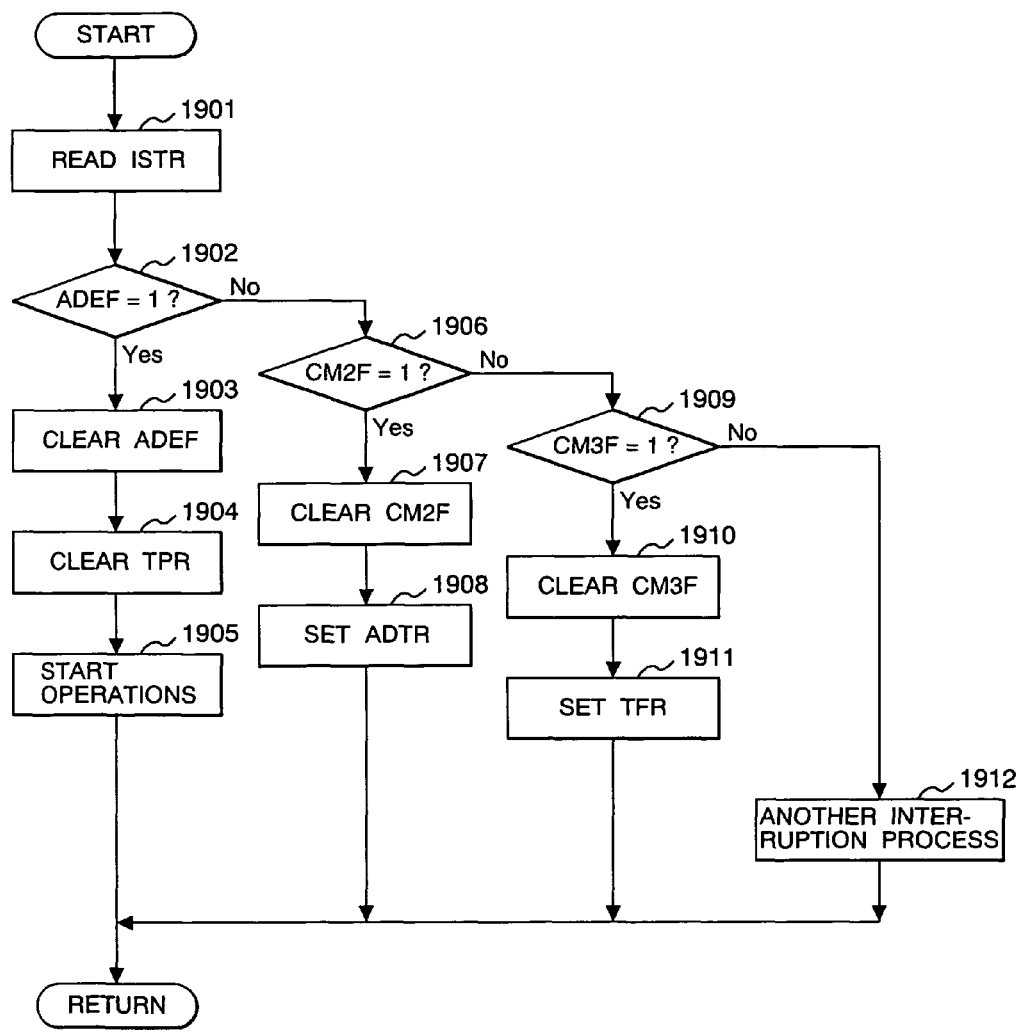
FIG. 19 is a flow chart showing an example of the interruption process of the second embodiment.

FIG. 19 shows an example of the interruption process of the electronic controller 1B. In this example, the A-D conversion is started by an interruption by the output of the CM2S 52 of the timer 5, and the operation is started by an interruption by the output of the ADE 41 of the A-D converter (ADC) 4, and the data transmission is started by an interruption by the CM3S 53 of the timer 5.

When the interruption controller (INTC) 7 outputs the INT 71, the CPU 2 detects the output of the INT 71 and starts the interruption process.

Firstly, the CPU 2 reads the interruption status register (ISTR) 72 (Step 1901) and decides whether the ADER 73, CM2F 76, and CM3F 77 are set at 1 or not (Steps 1902, 1906, 1909).

When the ADER 73 is set at 1, the CPU 2 clears the ADEF 73 (Step 1903), clears the TPR 411 (Step 1904), and starts the operation (Step 1905).

When the CM2F 76 is set at 1, the CPU 2 clears the CM2F 76 (Step 1907), sets the ADTR 404, and starts the A-D conversion of the A-D converter (ADC) 4 (Step 1908).

When the CM3F 77 is set at 1, the CPU 2 clears the CM3F 77 (Step 1910), sets the TFR 611, and starts the data transmission of the serial communication module (SCM) 6 (Step 1911).

When an interruption flag other than the aforementioned is set at 1, the CPU 2 executes a predetermined process corresponding to it (Step 1912).

When using the aforementioned interruption process in the electronic controller 1B, the same operations as those shown in FIGS. 10 and 11 can be performed. Furthermore, by the DMA transfer by the DMAC 410 and DMAC 610, it is not necessary to copy data from the data buffer of the A-D converter (ADC) 4 into the memory 3 by the CPU 2 and to store the data of the memory 3 in the TBUF 601 of the serial communication module (SCM) 6, so that the load on the CPU can be lightened.

Figure 20:
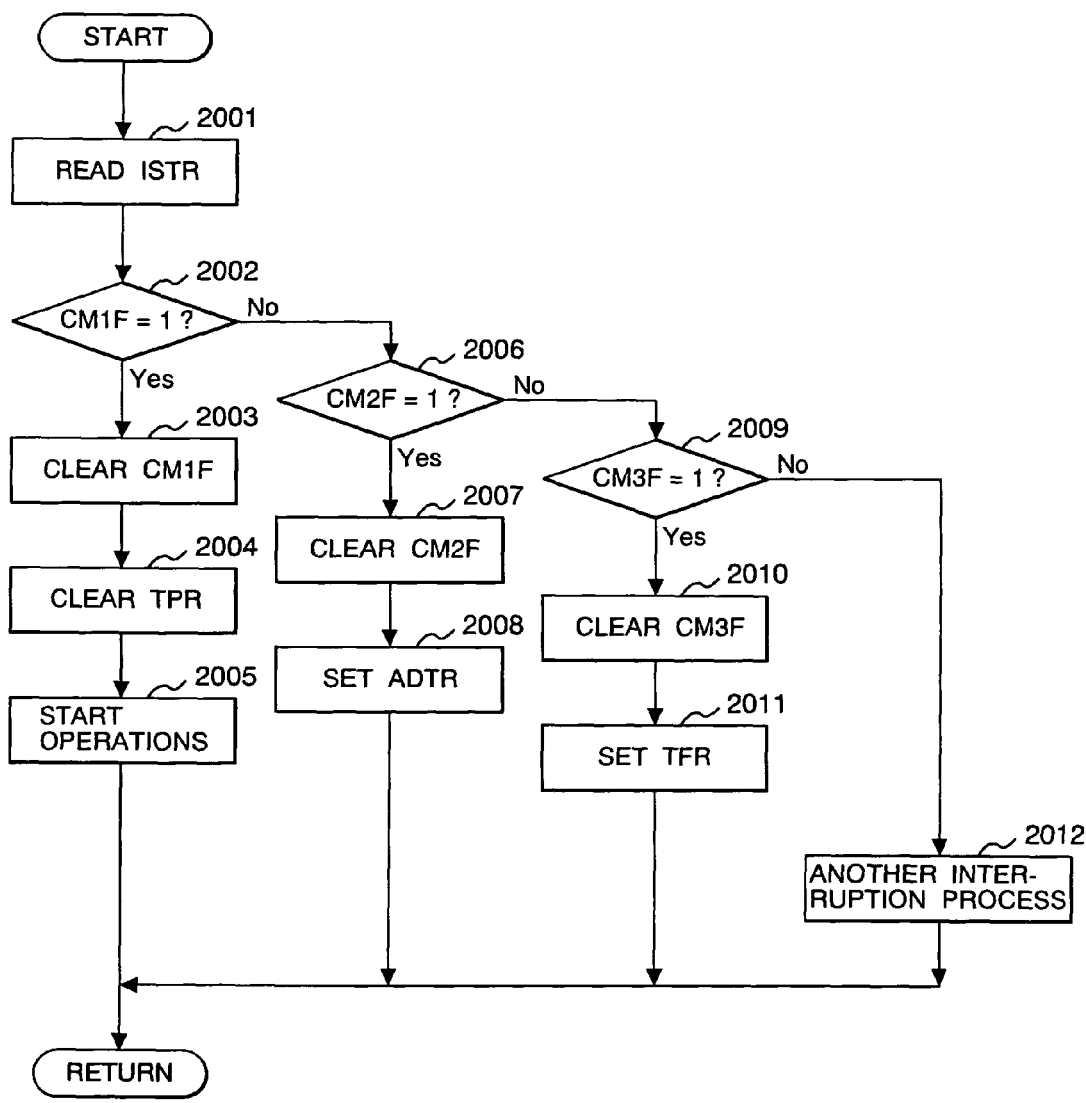
FIG. 20 is a time chart showing another example of the interruption process of the second embodiment.

FIG. 20 shows another example of the interruption process of the electronic controller 1B. This example is basically the same as the example of the interruption process shown in FIG. 19, though the respect that the operation is started by an interruption by the output of the CM1S 51 of the timer 5 is different.

When the interruption controller (INTC) 7 outputs the INT 71, the CPU 2 detects the output of the INT 71 and starts the interruption process.

Firstly, the CPU 2 reads the interruption status register (ISTR) 72 (Step 2001) and decides whether the CM1F 75, CM2F 76, and CM3F 77 are set at 1 or not (Steps 2002, 2006, 2009).

When the CM1F 75 is set at 1, the CPU 2 clears the CM1F 75 (Step 2003), clears the TPR 411 (Step 2004), and starts the operation (Step 2005).

When the CM2F 76 is set at 1, the CPU 2 clears the CM2F 76 (Step 2007), sets the ADTR 404, and starts the A-D conversion of the ADC 4 (Step 2008).

When the CM3F 77 is set at 1, the CPU 2 clears the CM3F 77 (Step 2010), sets the TPR 611, and starts the data transmission of the SCM 6 (Step 2011).

When an interruption flag other than the aforementioned is set at 1, the CPU 2 executes a predetermined process corresponding to it (Step 2012).

When the aforementioned interruption process is executed, the same operation as that shown in FIG. 13 can be performed. Further, when the ADE 41 and CM1S 51 are replaced with each other, the same operation as that of the example shown in FIG. 11 can be performed.

Further, in the electronic controller 1B of the second embodiment, by the interruption process of the CPU 2, the A-D conversion of the A-D converter (ADC) 4 is started, and the data transmission of the serial communication module (SCM) 6 is started, and the operation is started. However, instead of the interruption process, when the CPU 2 polls the interruption status register (ISTR) 72 of the interruption controller (INTC) 7 and the ADEF 73, CM1F 75, CM2F 76, and CM3F 77 are respectively set to 1, it is possible to start the A-D conversion of the A-D converter (ADC) 4, start the data transmission of the serial communication module (SCM) 6, and start the operation.

Furthermore, by the DMA transfer by the DMAC 410 and DMAC 610, it is not necessary to copy data from the data buffer of the A-D converter (ADC) 4 into the memory 3 by the CPU 2 and to store the data of the memory 3 in the TBUF 601 of the serial communication module (SCM) 6, so that the load on the CPU can be lightened.

Further, in the electronic controller relating to the present invention, the start timing of the A-D conversion of the A-D converter (ADC) 4 can be changed. For example, by the n-th operation by the CPU 2, the start timing of the "n+1"-th A-D conversion or the "n+2"-th and subsequent A-D conversion is decided, and the CM2R 502 of the timer 5 is reset, thus an analog signal can be fetched at desired timing. Similarly, when the CM3R 503 of the timer 5 is reset, the data transfer of the serial communication module (SCM) 6 can be started at desired timing.

Third Embodiment

Figure 21:
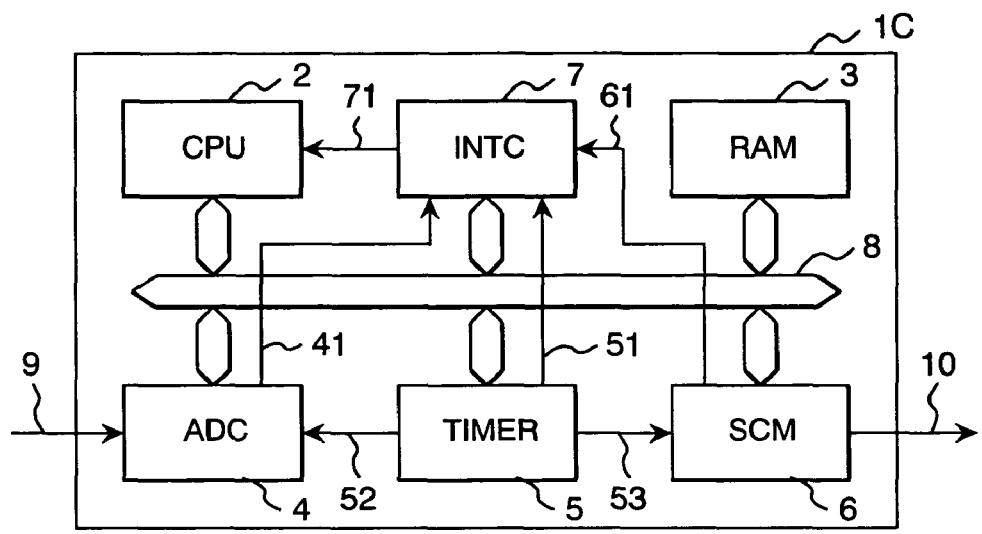
FIG. 21 is a schematic block diagram showing the third embodiment of the electronic controller relating to the present invention.

FIG. 21 is a schematic block diagram of the third embodiment of the electronic controller relating to the present invention.

An electronic controller 1C of the third embodiment shown in the drawing is basically the same as the electronic controller 1A of the first embodiment shown in FIG. 1, though the respect that the compare match 2 signal (CM2S) 52 and the compare match 3 signal (CM3S) 53 of the timer 5 are respectively connected (outputted) to the A-D converter (ADC) 4 and the serial communication module (SCM) 6 is different.

The electronic controller 1C has the central processing unit (CPU) 2, the memory 3, the analog-digital converter (ADC) 4 for fetching the analog signal 9 inputted from one or a plurality of sensors and converting it to a digital value, the timer 5 for outputting the compare match signals 51, 52, and 53 at predetermined timing, the serial communication module (SCM) 6 for transferring data to another device via the serial transmission path 10, and the interruption controller (INTC) 7 for detecting the compare match signal 51 outputted by the timer 5, the A-D conversion completion signal 41 outputted by the A-D converter (ADC) 4, and the transmission completion signal 61 outputted by the serial communication module (SCM) 6 and outputting the interruption signal 71 to the CPU 2 and these units are connected by the system bus 8.

The electronic controller 1C, on the basis of the count of the timer 5, repeatedly executes control in a fixed cycle (hereinafter, called a control cycle) that the A-D converter (ADC) 4 fetches the analog signal 9 inputted from one or a plurality of sensors and converts it to a digital value, and the CPU 2 executes the operation according to the data, and the serial communication module (SCM) 6 transmits the operation results to another device via the serial transmission path 10.

In the memory 3, a program executing operations on the basis of the digital value converted by the A-D converter (ADC) 4 is stored. The CPU 2, when the interruption controller (INTC) 7 generates an interruption, on the basis of the interruption factor, executes the program.

The interruption controller (INTC) 7 detects the output of the compare match 1 signal (CM1S) 51 by the timer 5, the output of the A-D conversion completion signal (ADE) 41 by the A-D converter (ADC) 4, and the output of the transfer completion signal (TRE) 61 by the serial communication module (SCM) 6, stores outputting of each signal, and when detecting the output of at least one signal, outputs the interruption signal (INT) 71 to the CPU 2.

Further, although not shown in the drawing, it is possible to install a register for selecting whether or not to generate an interruption for each input signal of the interruption controller (INTC) 7 when the output of the signal is detected and even if a certain signal is outputted, not to generate an interruption. By doing this, the unnecessary interruption process of the CPU 2 can be deleted.

Figure 22:
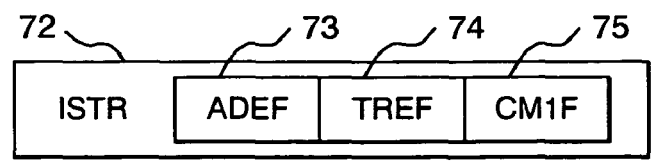
FIG. 22 is a drawing used for explanation of the interruption status register of the interruption controller of the third embodiment.

FIG. 22 shows the interruption status register (ISTR) 72 of the interruption controller (INTC) 7.

The interruption status register (ISTR) 72 has the A-D conversion completion flag (ADER) 73 which is set when the ADE 41 is outputted, the transfer completion flag (TREF) 74 which is set when the TRE 61 is outputted, and the compare match 1 flag (CM1F) 75 which is set when the CM1S 51 is outputted.

The interruption status register (ISTR) 72 can read and write data in the CPU 2. The CPU 2 reads the interruption status register (ISTR) 72 and can decide an interruption factor. Further, the CPU 2 writes 0 or 1 into each flag, thereby can clear the corresponding flag.

The timer 5 has the same constitution as that shown in FIG. 3, so that the explanation will be omitted.

Figure 23:
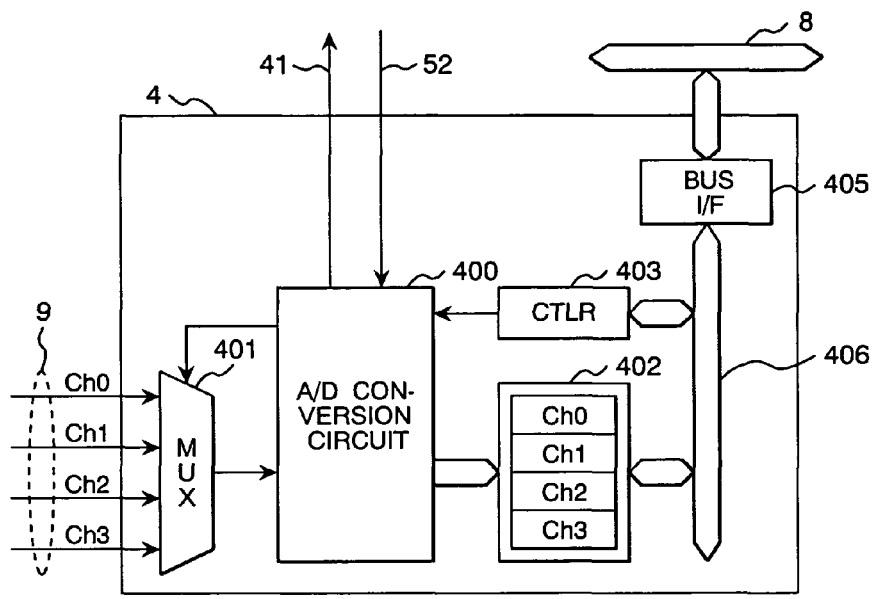
FIG. 23 is a block diagram of the A-D converter of the third embodiment.

FIG. 23 shows the constitution of the A-D converter (ADC) 4 of this embodiment.

The A-D converter (ADC) 4 is basically the same as that shown in FIG. 5, though the respect that the A-D conversion is started by the CM2S 52 outputted by the timer 5 is different. In correspondence to it, the A-D conversion start register (ADTR) 404 for starting the A-D conversion is deleted.

The A-D converter (ADC) 4 has the A-D conversion circuit 400, the analog multiplexer (MUX) 401 for selecting one of a plurality of analog inputs 9, the data buffer 402 for storing a converted digital value, and the control register (CTLR) 403 for selecting an input channel for A-D conversion. The data buffer 402 and CTLR 403 are connected to the module internal bus 406 and the module internal bus 406 is connected to the system bus 8 via the bus interface circuit 405. The CPU 2, via the system bus 8, the bus interface circuit 405, and the module internal bus 406, reads and writes data into the registers and data buffer.

When the A-D conversion circuit 400 detects the output of the CM2S 52 of the timer 5, it starts the A-D conversion on the basis of the setting of the CTLR 403.

The A-D conversion circuit 400 selects the input channel designated by the CTLR 403 by the MUX 401, reads the analog value, converts it to a digital value, and then stores it at a predetermined address of the data buffer 402. When converting a plurality of input channels, the A-D conversion circuit 400 sequentially switches one input channel by the MUX 401 and converts it to a digital value.

Further, the A-D conversion circuit 400, when the A-D conversion of input channels designated by the CTLR 403 is all completed, outputs the A-D conversion completion signal (ADE) 41.

Figure 24:
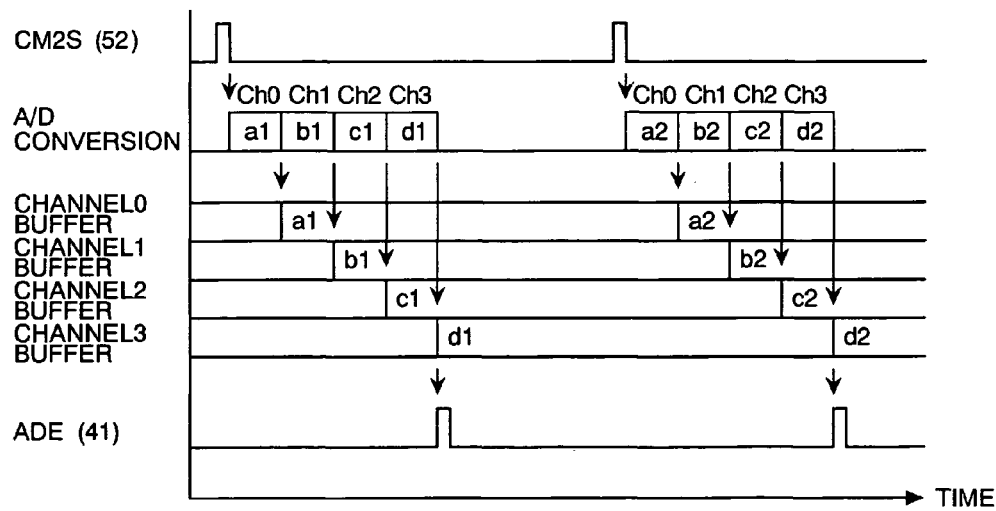
FIG. 24 is a time chart showing an operation example of the A-D converter shown in FIG. 23.

FIG. 24 shows an operation example of the A-D converter (ADC) 4. This operation example shows conversion of four input channels and the axis of abscissa of the graph indicates time.

Firstly, when the timer 5 outputs the CM2S 52, the A-D conversion circuit 400 reads the analog values in the order of the input channels 0, 1, 2, and 3, converts them to digital values, and stores the digital values at a predetermined address of the data buffer 402. When the A-D conversion of all the channels is completed, the A-D conversion circuit 400 outputs the A-D conversion completion signal (ADE) 41. The interruption controller (INTC) 7 detects the output of the ADE 41 and outputs the interruption signal (INT) 71, so that the CPU 2 can detect completion of the A-D conversion.

Figure 25:
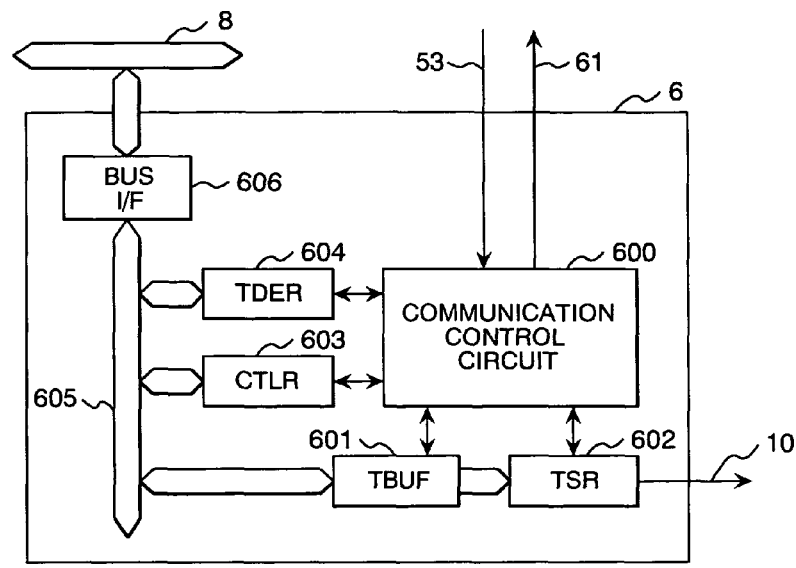
FIG. 25 is a block diagram of the serial communication module of the third embodiment.

FIG. 25 shows the constitution of the serial communication module (SCM) 6 shown in FIG. 21.

The serial communication module (SCM) 6 is basically the same as the SCM shown in FIG. 7, though the respect that the data transmission is started by the CM3S 53 outputted by the timer 5 is different.

The SCM 6 has the communication control circuit 600, the transmission buffer (TBUF) 601 for storing data to be transmitted, the transmission shift register (TSR) 602 for serial transmission, the control register (CTLR) 603, and the transmission buffer empty flag register (TDER) 604. Further, the components relating to reception of the serial communication are omitted.

The TBUF 601, CTLR 603, and TDER 604 are connected to the module internal bus 605 and the module internal bus 605 is connected to the system bus 8 via the bus interface circuit 606. The CPU 2, via the system bus 8, the bus interface circuit 606, and the module internal bus 605, reads and writes data into the registers and data buffer.

The TDER 604 indicates that transfer data is not stored in the TBUF 601 or stored data is all transferred to the TSR 602 and the TBUF 601 is empty. The TDER 604 is set at 1 in the initial state and the value is cleared to 0 by writing by the CPU 2.

The communication control circuit 600, when detecting the output of the CM3S 53 of the timer 5 when the TDER 604 is cleared to 0, considers that transfer data is stored in the TBUF 601, sets the data of the TBUF 601 in the TSR 602, and starts the data transmission via the serial transmission path 10. Therefore, when data must be transferred at predetermined timing, if a predetermined count is set in the CM3R 503 of the timer 5, the data transmission of the serial communication module (SCM) 6 is automatically executed at the predetermined timing and the start process of data transmission by the CPU 2 is unnecessary.

Further, the communication control circuit 600, when the data of the TBUF 601 is all set in the TSR 602 and the TBUF 601 becomes empty, sets the TDER 604 to 1. Furthermore, when the data transmission via the serial transmission path 10 is completed, the communication control circuit 600 outputs the data transmission completion signal (TRE) 61.

Figure 26:
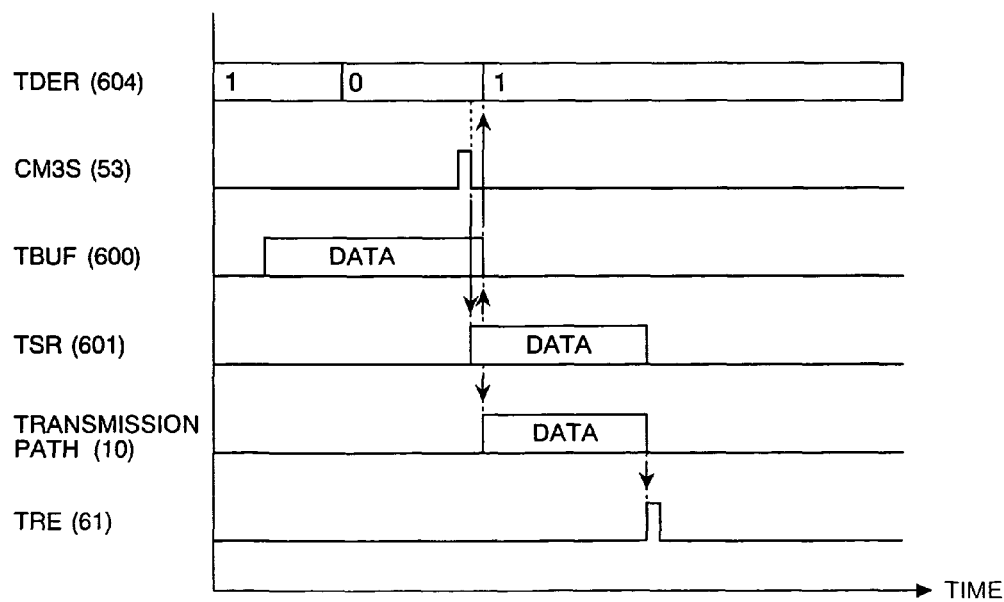
FIG. 26 is a time chart showing an operation example of the serial communication module shown in FIG. 25.

FIG. 26 shows an operation example of the serial communication module (SCM) 6 of this embodiment. The axis of abscissa of the graph indicates time.

Firstly, the CPU 2 writes data into the TBUF 601 and clears the TDER 604 to 0 and then the timer 5 outputs the CM3S 53 at the predetermined timing.

The communication control circuit 600, when detecting the output of the CM3S 53 when the TDER 604 is cleared to 0, sets the data written in the TBUF 601 in the TSR 602 and starts the data transmission via the serial transmission path 10.

When the data of the TBUF 601 is all set in the TSR 602, the communication control circuit 600 sets the TDER 604 to 1.

Furthermore, when the data transmission is completed, the communication control circuit 600 outputs the TRE 61. When the TRE 61 is outputted, the interruption controller (INTC) 7 outputs the interruption signal (INT) 71, so that the CPU 2 can detect the completion of the data transmission.

Further, the communication control circuit 600, when detecting the output of the CM3S 53 of the timer 5 when the TDER 604 is set at 1, stores the output of the CM3S 53 and then may start the data transmission when the TDER 604 is cleared to 0.

Further, the communication control circuit 600 sets the data of the TBUF 601 in the TSR 602 when the TDER 604 is cleared to 0, enters the data transmission standby state, then detects the output of the CM3S 53 of the timer 5, and may start the data transmission.

Furthermore, the serial communication module (SCM) 6 may include a register for selecting whether to start the data transmission when the TDER 604 is cleared to 0 or to start the data transmission when the output of the CM3S 53 of the timer 5 is detected.

In the electronic controller 1C of this embodiment, by the output of the compare match signals CM2S 52 and CM3S 53 of the timer 5, the A-D converter (ADC) 4 starts the A-D conversion and the serial communication module (SCM) 6 starts the data transmission. These operations require no process of the CPU 2.

On the other hand, the CPU 2, by an interruption of the interruption controller (INTC) 7 generated by the output of the ADE 41 of the A-D converter (ADC) 4 or the output of the compare match signal CM1S 51 of the timer 5, starts the operation.

Figure 27:
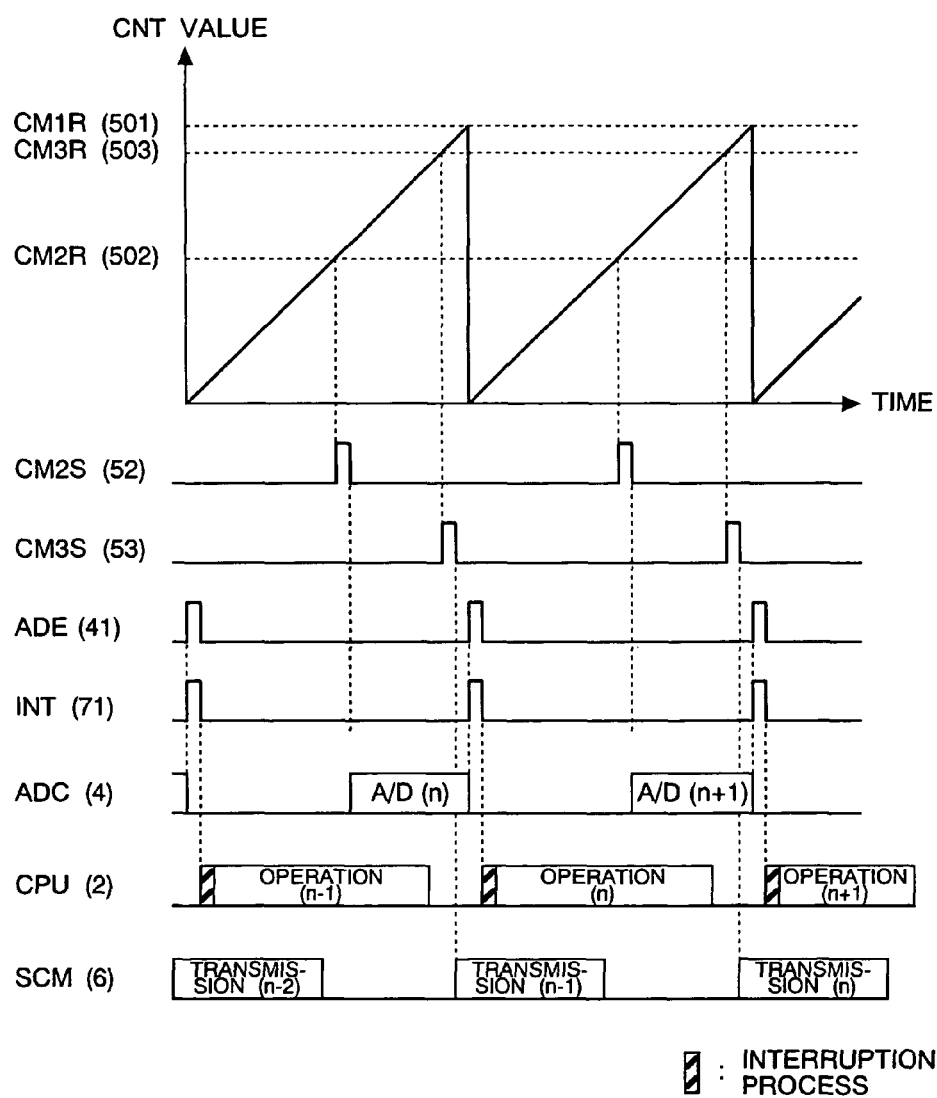
FIG. 27 is a time chart used for explanation of an operation example of the electronic controller of the third embodiment.
Figure 28:
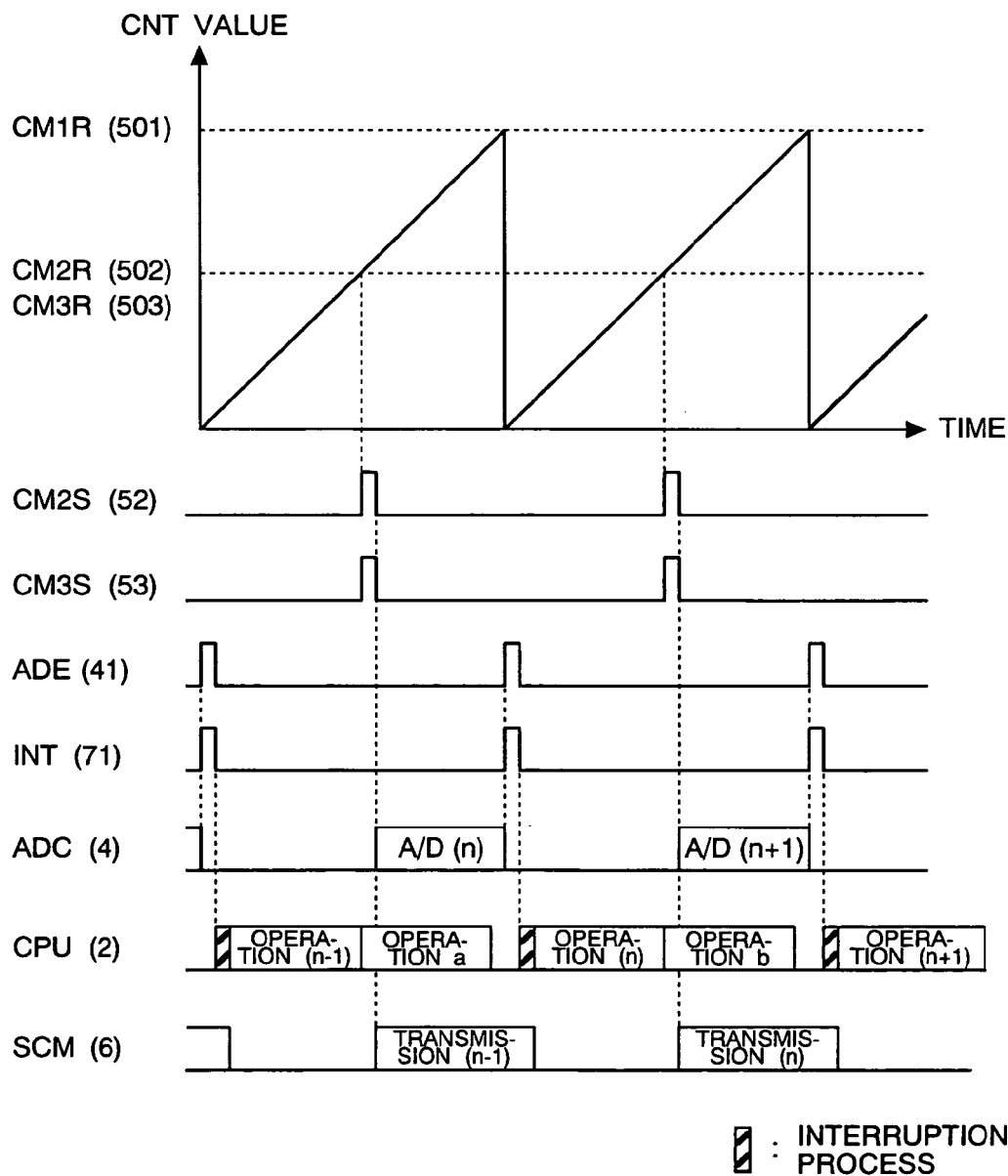
FIG. 28 is a time chart used for explanation of another operation example of the electronic controller of the third embodiment.
Figure 29:
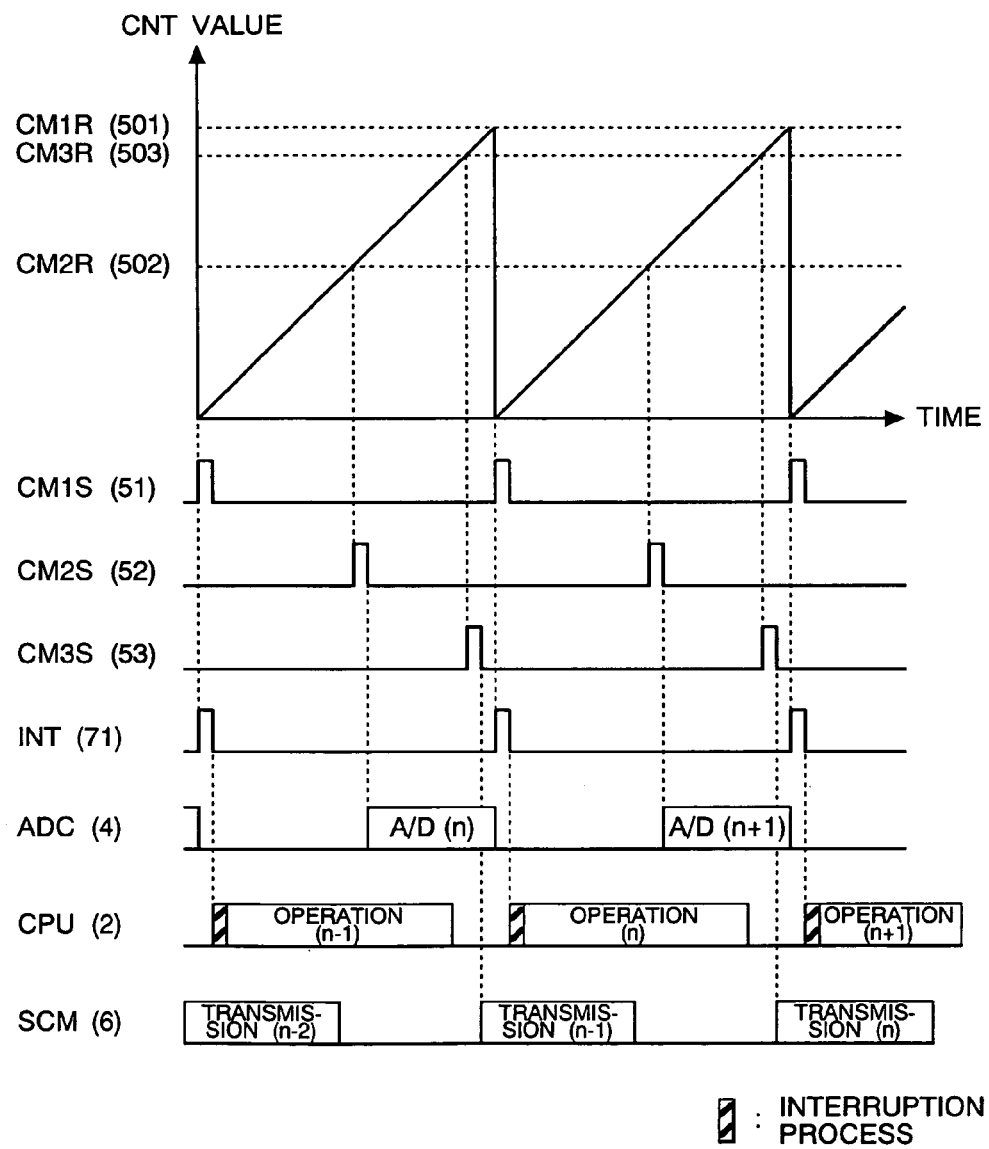
FIG. 29 is a time chart used for explanation of still another operation example of the electronic controller of the third embodiment.

FIGS. 27, 28, and 29 show operation examples of the third embodiment.

In the operation example shown in FIG. 27, the CM3R 53 is set so that the data transmission of the serial communication module (SCM) 6 is started immediately after completion of the operation of the CPU 2.

When the count of the counter register (CNT) 500 of the timer 5 matches with the CM2R 502, the timer 5 outputs the CM2S 52 and the A-D converter (ADC) 4 detects it and starts the A-D conversion.

Further, the A-D converter (ADC) 4, when the A-D conversion is completed, outputs the ADE 41 and the interruption controller (INTC) 7 detects it and outputs the INT 71. When the CPU 2 detects the output of the INT 71, it starts the operation.

Further, when the count of the counter register (CNT) 500 of the timer 5 matches with the CM3R 503, the timer 5 outputs the CM3S 53 and the serial communication module (SCM) 6 detects it and starts the data transmission.

In this operation example shown in FIG. 27, the A-D conversion of the A-D converter (ADC) 4, the operation of the CPU 2, and the data transmission of the serial communication module (SCM) 6 are executed in parallel, so that the control cycle can be shortened and the response time from the A-D conversion (input process) to the data transmission (output process) can be shortened. Furthermore, the CPU 2 does not need to perform the start process of the A-D conversion and data transmission, so that the load on the CPU 2 can be lightened.

On the other hand, in the operation example shown in FIG. 28, the CM2R 502 and CM3R 503 are set at the same value so that immediately after completion of the operation of the CPU 2, the data transmission of the serial communication module (SCM) 6 is started and the next A-D conversion of the A-D converter ADC 4 is started.

When the count of the count register (CNT) 500 of the timer 5 matches with the CM2R 502 and the CM3R 503, the timer 5 outputs the CM2S 52 and CM3S 53. The A-D converter (ADC) 4 detects the output of the CM2S 52 and starts the A-D conversion and the serial communication module (SCM) 6 detects the output of the CM3S 53 and starts the data transmission.

Further, the A-D converter (ADC) 4, when the A-D conversion is completed, outputs the ADE 41 and the interruption controller (INTC) 7 detects it and outputs the INT 71. When the CPU 2 detects the output of the INT 71, it starts the operation.

In this operation example, the CM2S 52 and CM3S 53 are outputted. However, using either of the CM2R 502 and CM3R 503, either of the CM2S 52 and CM3S 53 may be outputted. In this case, the A-D converter (ADC) 4 and the serial communication module (SCM) 6 respectively start the A-D conversion and data transmission by the same compare match signal.

Further, as indicated in this operation example, during execution of the A-D conversion and data transfer, the CPU 2 can execute another process (process a or process b).

The operation example shown in FIG. 29 is basically the same as the operation example shown in FIG. 28, though the respect that by an interruption generated by the CM1S 51 instead of the interruption generated by the output of the ADE 41, the CPU 2 starts the operation is different.

In this operation example, the CM1R 501 is set so that the operation of the CPU 2 is started immediately after completion of the A-D conversion of the A-D converter (ADC) 4 and the CM3R 503 is set so that the data transmission of the serial communication module (SCM) 6 is started immediately after completion of the operation of the CPU 2.

When the count of the counter register (CNT) 500 of the timer 5 matches with the CM2R 502, the timer 5 outputs the CM2S 52 and the A-D converter (ADC) 4 detects it and starts the conversion.

When the count of the count register (CNT) 500 of the timer 5 matches with the CM1R 501, the timer 5 outputs the CM1S 51 and the interruption controller (INTC) 7 detects it and outputs the INT 71. When the CPU 2 detects the output of the INT 71, it starts the operation.

Further, when the count of the counter register (CNT) 500 of the timer 5 matches with the CM3R 503, the timer 5 outputs the CM3S 53 and the serial communication module (SCM) 6 detects it and starts the data transmission.

In this operation example, similarly to the operation example shown in FIG. 28, the A-D conversion of the A-D converter (ADC) 4, the operation of the CPU 2, and the data transmission of the serial communication module (SCM) 6 are executed in parallel, so that the control cycle can be shortened and the response time from the A-D conversion (input process) to the data transmission (output process) can be shortened.

Further, when the ADE 41 and CM1S 51 are replaced with each other, the same operation as that of the example shown in FIG. 28 can be performed.

In the electronic controller 1C of the third embodiment relating to the present invention which is explained above, the CPU 2 starts the operation by an interruption from the interruption controller (INTC) 7. However, instead of the interruption process, when the CPU 2 polls the interruption status register (ISTR) 72 of the interruption controller (INTC) 7 and the ADEF 72 or CM1F 75 is set to 1, the CPU 2 may start the operation.

Further, in the electronic controller 1C of this embodiment, the start timing of the A-D conversion of the A-D converter (ADC) 4 can be changed. For example, by the n-th operation by the CPU 2, the start timing of the "n+1"-th A-D conversion or the "n+2"-th and subsequent A-D conversion is decided, and the CM2R 502 of the timer 5 is reset, thus an analog signal can be fetched at desired timing. Similarly, when the CM3R 503 of the timer 5 is reset, the data transfer of the serial communication module (SCM) 6 can be started at desired timing.

Fourth Embodiment

Figure 30:
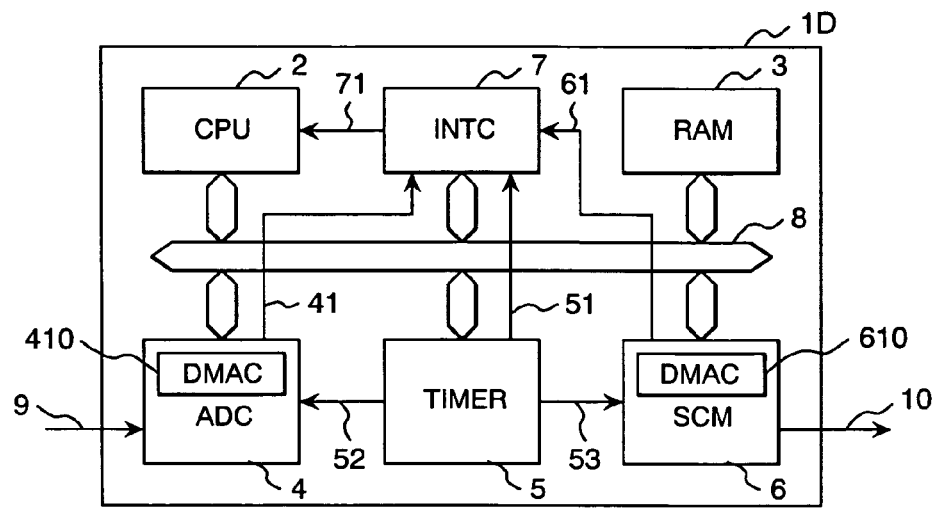
FIG. 30 is a schematic block diagram showing the fourth embodiment of the electronic controller relating to the present invention.

FIG. 30 is a schematic block diagram of the fourth embodiment of the electronic controller relating to the present invention.

An electronic controller 1D of the fourth embodiment shown in the drawing is basically the same as the electronic controller 1C of the third embodiment shown in FIG. 21, though the respect that the A-D converter (ADC) 4 and the serial communication module (SCM) 6 respectively have the dynamic memory access controllers (DMAC) 410 and 610 is different.

The DMAC 410 has a function for transferring data converted by the A-D converter (ADC) 4 to the memory 3. Further, the DMAC 610 has a function for transferring data of the memory 3 to the serial communication module (SCM) 6 and starting the data transmission of the SCM. Here, the data transfer by the DMACs 410 and 610 is called DMA transfer.

Figure 31:
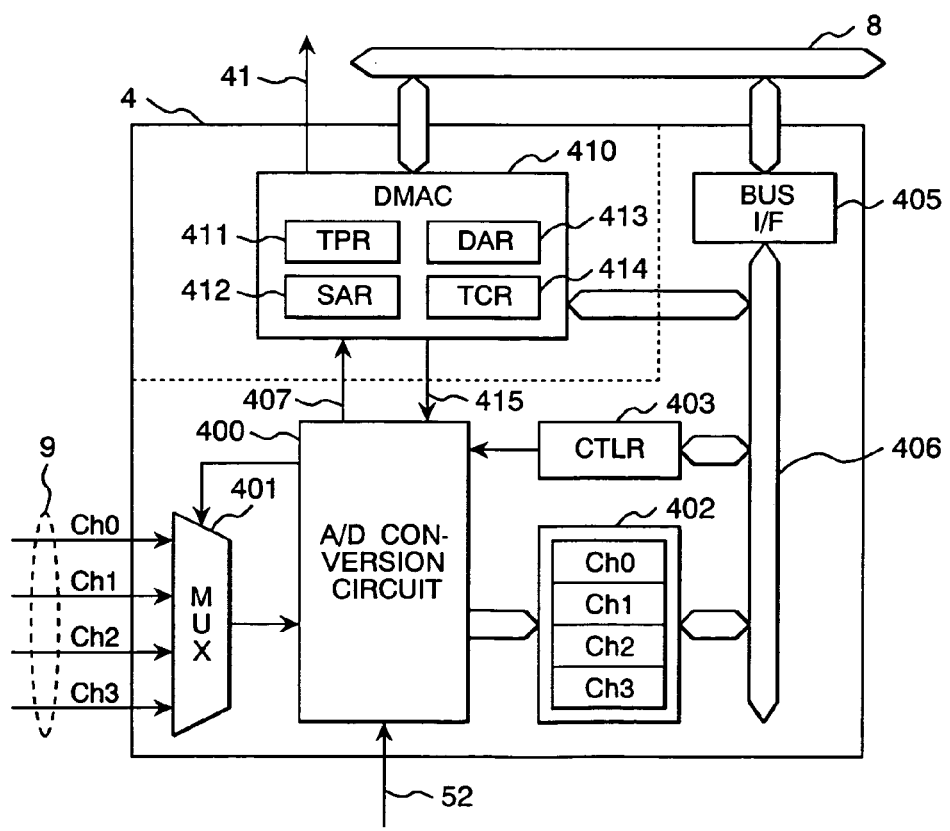
FIG. 31 is a block diagram of the A-D converter of the fourth embodiment.

FIG. 31 shows the constitution of the A-D converter (ADC) 4 shown in FIG. 30. The ADC 4 in this example is basically the same as that shown in FIG. 23, though the respect that the ADC 4 has the dynamic memory access controller (DMAC) 410 is different. Further, the DMAC 410 may be a module independent of the A-D converter (ADC) 4.

The DMAC 410 has a transfer pending flag register (TPR) 411, a transfer source address register (SAR) 412, a transfer destination address register (DAR) 413, and a transfer count register (TCR) 414.

The TPR 411 is in a zero-clear state first and when the DMA transfer is completed, it is set to 1. Thereafter, until this register is cleared to 0, the DMA transfer is not executed and is kept in a pending state.

The A-D conversion circuit 400, when the output of the CM2S 52 is detected, starts the A-D conversion and when the A-D conversion is completed, ascertains the DMA transfer request signal (DREQ) 407.

The DMAC 410, when the TPR 411 is in the 0-clear state and the DREQ 407 is in the ascert state, outputs the DMA transfer reception signal (DRAK) 415 to the A-D conversion circuit 400 and starts the DMA transfer. And, when the DMA transfer of the count set in the TCR 414 is completed, the DMAC 410 sets the TPR 411 to 1 and outputs the A-D conversion completion signal (ADE) 41.

On the other hand, the A-D conversion circuit 400, when the DRAK 415 is outputted, negates the DREQ 407.

In the DMA transfer by the DMAC 410, the DMAC 410 reads data from the address set in the SAR 412 and writes it at the address designated by the DAR 413. Further, when a transfer count of 2 times or more is set in the TCR 414, while increasing the addresses set in the SAR 412 every DMA transfer, the DMAC 410 reads data and while increasing the addresses set in the DAR 413, writes data. Therefore, it is desirable to set the top address of the data to be transferred by the data buffer 402 of the A-D converter (ADC) 4 in the SAR 413, to set the top address of a predetermined area of the memory 3 for storing the converted data in the DAR 413, and to set the number of data to be transferred in the TCR 414. Further, after execution of the DMA transfer by the set count in the TCR 414, it is desirable to automatically reload the original top addresses into the SAR 412 and DAR 413.

Figure 32:
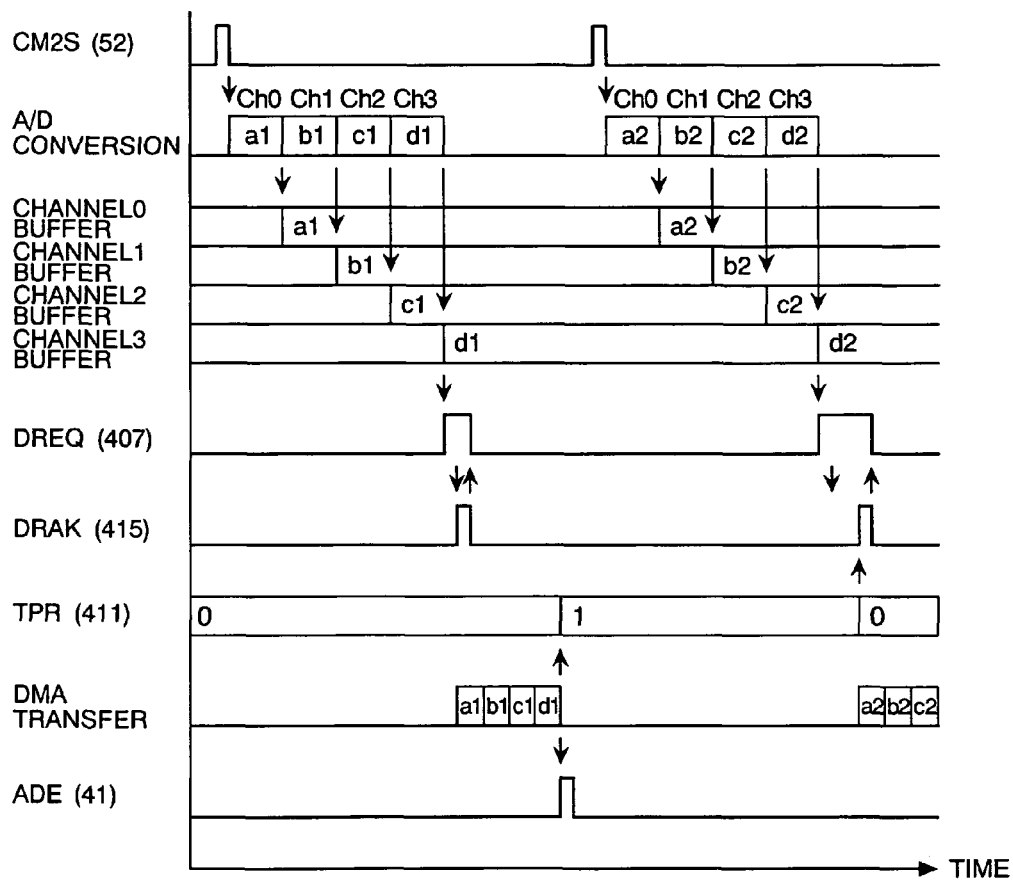
FIG. 32 is a time chart showing an operation example of the A-D converter shown in FIG. 31.

FIG. 32 shows an operation example of the A-D converter (ADC) 4 mentioned above. This operation example indicates conversion of four input channels and the axis of abscissa of the graph indicates time.

Firstly, when the timer 5 outputs the CM2S 52, the A-D conversion circuit 400 reads analog values in the order of the input channels 0, 1, 2, and 3, converts them to digital values, and stores the digital values at a predetermined address of the data buffer 402.

When the A-D conversion of all the channels is completed, the A-D conversion circuit 400 ascertains the DREQ 407.

The DMAC 410, when the DREQ 407 is ascertained, outputs the DRAK 415 and starts the DMA transfer. And, when the DMA transfer is completed, the DMAC 410 sets the TPR 411 to 1 and outputs the A-D conversion completion signal (ADE) 41. When the ADE 41 is outputted, the interruption controller (INTC) 7 outputs the interruption signal (INT) 71, so that the CPU 2 can detect completion of the A-D conversion and DMA transfer.

On the other hand, the A-D conversion circuit 400, when the DRAK 415 is outputted, negates the DREQ 407.

In the second A-D conversion, the A-D conversion circuit 400 ascertains the DREQ 407 after completion of the A-D conversion. However, since the TPR 411 is set at 1, the DMAC 410 does not start the DMA transfer and enters the transfer pending state. Thereafter, when the TPR 411 is cleared to 0 by the CPU 2, the DMAC 410 starts the DMA transfer.

Further, in this example, the DMAC 410 can put the DMA transfer into the pending state using the TPR 411. However, without using the TPR 411, it is possible to start the DMA transfer when the A-D conversion circuit ascertains the DREQ 407.

Figure 33:
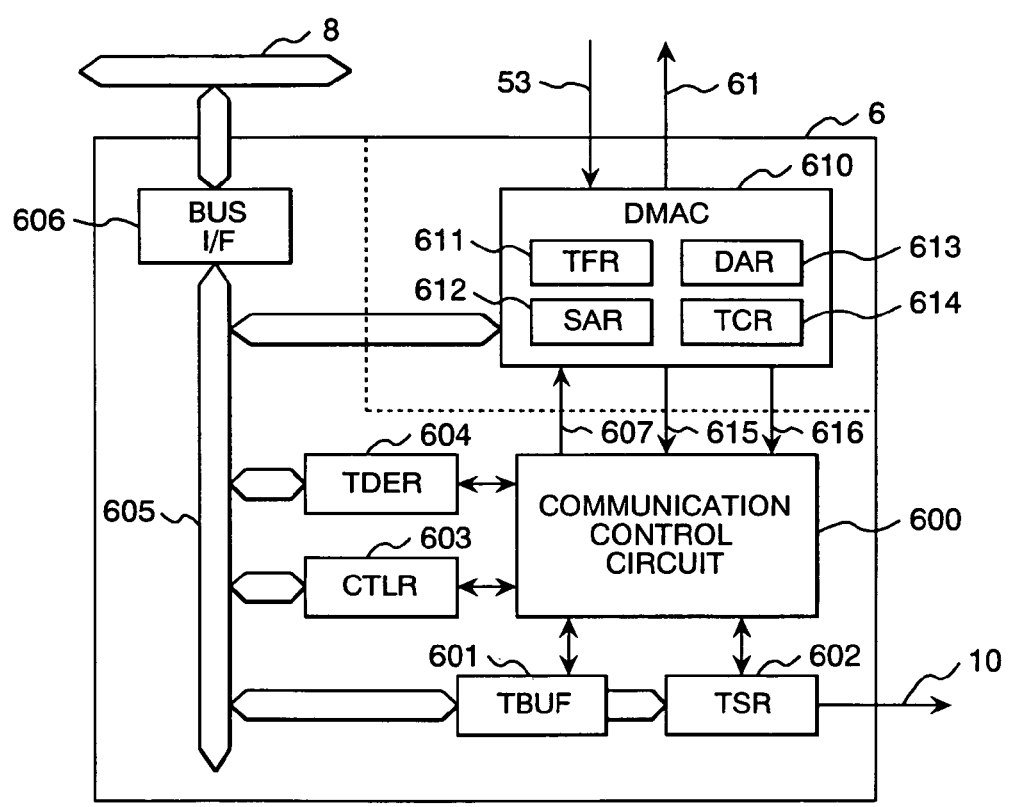
FIG. 33 is a block diagram of the serial communication module of the fourth embodiment.

FIG. 33 shows the constitution of the serial communication module (SCM) 6 shown in FIG. 30. The difference from the third embodiment shown in FIG. 25 is that the module has the dynamic memory access controller (DMAC) 610. Further, the DMAC 610 may be independent of the serial communication module (SCM) 6. Further, the components relating to reception of the serial communication are omitted.

The DMAC 610 has a function for transferring data of the memory 3 to the serial communication module (SCM) 6 and starting the data transmission by the serial communication module (SCM) 6. The DMAC 610 has the transfer flag register (TFR) 611, the transfer source address register (SAR) 612, the transfer destination address register (DAR) 613, and the transfer count register (TCR) 614. The TFR 611, SAR 612, DAR 613, and TCR 614 can be read and written by the CPU 2.

The TFR 611 is firstly set in the 0-clear state and when it is set to 1 by the CPU 2, the DMA transfer can be performed. The TFR 611 is kept in the set state until it is set to 0 by the CPU 2.

The communication control circuit 600, when the TBUF 601 is empty, ascertains the DMA transfer request signal (DREQ) 607.

The DMAC 610, when it detects the output of the CM3S 53 of the timer 5 when the TFR 611 is in the 1-set state and the DREQ 607 is in the ascertainment state, outputs the DMA transfer reception signal (DRAK) 615 to the communication control circuit 600 and starts one DMA transfer. And, when one DMA transfer is completed, the DMAC 610 outputs the DMA transfer completion signal (DACK) 616. The DMA transfer operation is repeated by the count set in the TCR 614 and when the final DMA transfer is completed, the DMAC 610 outputs the data transmission completion signal (TRE) 61.

On the other hand, the communication control circuit 600, when the DRAK 615 is outputted, negates the DREQ 607 and when the DACK 616 is outputted, clears the TDER 604 to 0. And, the communication control circuit 600 sets the data transferred to the TBUF 601 in the TSR 602, starts the data transmission via the serial transmission path 10, sets the TDER 604 to 1 again, and ascertains the DREQ-607.

In the DMA transfer by the DMAC 610, the DMAC 610 reads data from the address set in the SAR 612 and writes it into the address designated by the DAR 613. Further, when a transfer count of 2 times or more is set in the TCR 614, while increasing the addresses set in the SAR 612 every DMA transfer, the DMAC 610 reads data and writes it into the address designated by the DAR 613. Therefore, it is desirable to set the top address of the data to be transferred, which is stored in the memory 3, in the SAR 612, to set the address of the TBUF 601 in the DAR 613, and to set the number of data to be transferred in the TCR 614. Further, after execution of the DMA transfer by the set count in the TCR 614, it is desirable to automatically reload the original top address into the SAR 612.

Figure 34:
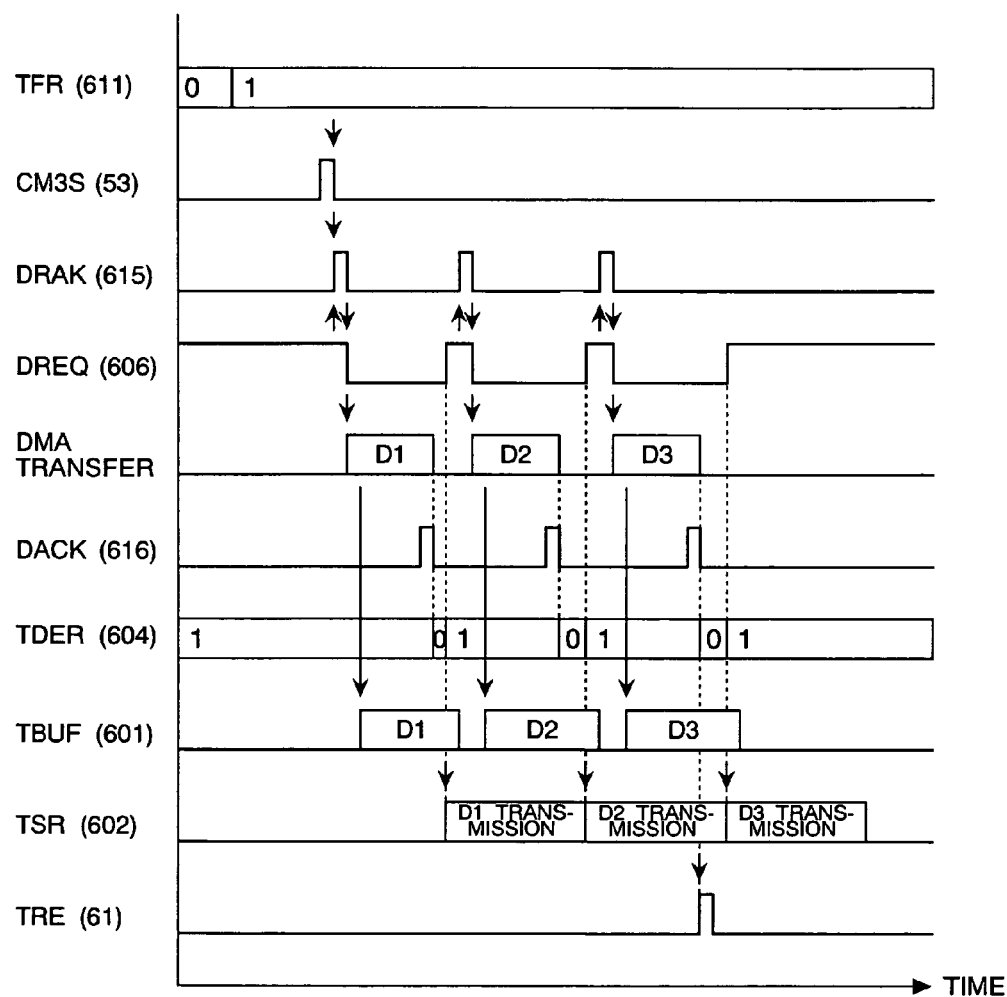
FIG. 34 is a time chart showing an operation example of the serial communication module shown in FIG. 33.

FIG. 34 shows an operation example of the serial communication module (SCM) 6. In this operation example, the data transfer count is set at 3. Further, the axis of abscissa of the graph indicates time.

Firstly, when the TFR 611 is set to 1 by the CPU 2 and then the timer 5 outputs the CM3S 53, the DMAC 610 detects ascertainment of the DREQ 607, outputs the DRAK 615, and starts the first DMA transfer. And, when the first DMA transfer is completed, the DMAC 610 outputs the DACK 616.

On the other hand, the communication control circuit 600, when the DRAK 615 is outputted, negates the DREQ 607 and when the DACK 616 is outputted, clears the TDER 604 to 0. And, the communication control circuit 600 sets the data transferred to the TBUF 601 in the TSR 602, starts the data transmission via the serial transmission path 10, sets the TDER 604 to 1 again, and ascertains the DREQ 607 for the next DMA transfer.

Next, the DMAC 610 detects ascertainment of the DREQ 607, outputs the DRAK 615, increases the addresses of the SAR 612, and starts the second DMA transfer. The subsequent operation is the same as that of the first DMA transfer.

Furthermore, when the third DMA transfer is completed, the DMAC 610 outputs the TRE 61. When the TRE 61 is outputted, the interruption controller (INTC) 7 outputs the interruption signal (INT) 71, so that the CPU 2 can detect DMA transfer completion for data transmission.

Further, in this example, when the final DMA transfer is completed, the DMAC 610 outputs the TRE 61. However, for example, it is possible to notify transmission completion to the DMAC 610 from the communication control circuit 600 every completion of the serial transmission and when the DMAC 610 counts the number of transmission completion notifications and receives the notifications by the same count as that of the TCR 614, that is, when the final serial transmission is completed, to output the TRE 61. Or, it is possible to prepare a register for notifying the number of transmission data to the communication control circuit 600 and when the count of serial transmission completion becomes equal to the register value, to output the TRE 61 by the communication control circuit 600.

Further, in this example, the DMAC 610 starts the DMA transfer of transmission data by the output of the CM3S 53 of the timer 5 and furthermore the communication control circuit 600 starts the data transmission by the output of the DACK 616 of the DMAC 610, so that the CPU 2 does not need to perform the process concerning the data transfer of the serial communication module (SCM) 6 and the load on the CPU 2 can be lightened.

Also in the electronic controller 1D of the fourth embodiment described above, the same operations as the operation examples shown in FIGS. 27, 28, and 29 can be performed.

Further, similarly to the third embodiment, instead of start of the operation of the CPU 2 by the interruption process, the CPU 2 polls the interruption status register (ISTR) 72 of the interruption controller (INTC) 7 and when the ADEF 73 or CM1F 75 is set to 1, the CPU 2 may start the operation.

Further, in the electronic controller 1D of this embodiment, the start timing of the A-D conversion of the A-D converter (ADC) 4 can be changed. For example, by the n-th operation by the CPU 2, the start timing of the "n+1"-th A-D conversion or the "n+2"-th and subsequent A-D conversion is decided, and the CM2R 502 of the timer 5 is reset, thus an analog signal can be fetched at desired timing. Similarly, when the CM3R 503 of the timer 5 is reset, the data transfer of the serial communication module (SCM) 6 can be started at desired timing.

Figure 35:
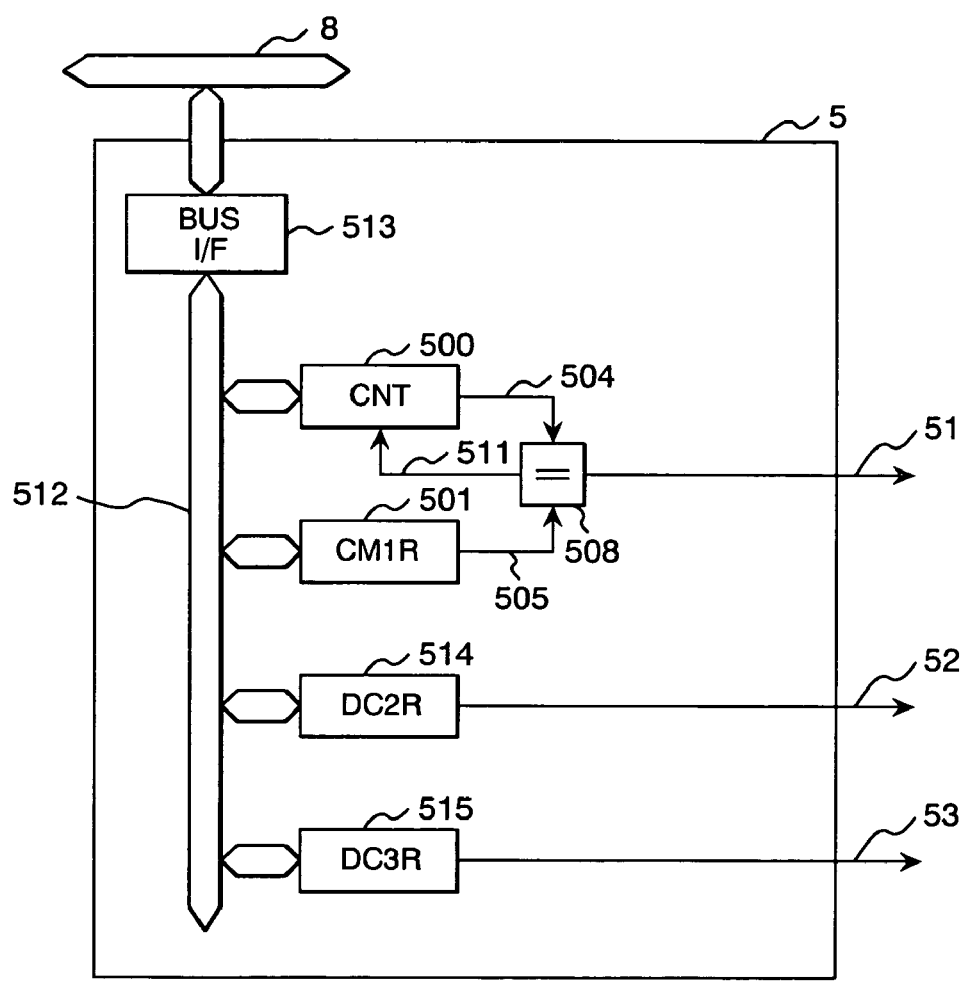
FIG. 35 is a block diagram of the timer of the fourth embodiment.

FIG. 35 shows another constitution of the timer 5.

The drawn timer 5 is basically the same as that shown in FIG. 3, though the respect that the timer 5 outputs the CM2S 52 by a down-count 2 register (DC2R) 514 and outputs the CM3S 53 by a down-count 3 register (DC3R) 515 is different.

The down-count 2 register (DC2R) 514 and down-count 3 register (DC3R) 515 are connected to the system bus 8 via a bus interface circuit 513. The CPU 2 reads and writes data in each register via the system bus 8, the bus interface circuit 513, and the module internal bus 512.

The DC2R 514 is a counter, when the value is set by the CPU 2, for decreasing the set value on a predetermined clock cycle immediately after it and when the value becomes 0, outputs the CM2S 52 and stops. Similarly, the DC3R 515 is a counter, when the value is set by the CPU 2, for decreasing the set value on a predetermined clock cycle immediately after it and when the value becomes 0, outputs the CM3S 53 and stops.

Further, the DC2R 514 and DC3R 515 respectively operate independently. By these registers, the timer 5, after an optional time from register setting by the CPU 2, can output the CM2S 52 and CM3S 53.

Figure 36:
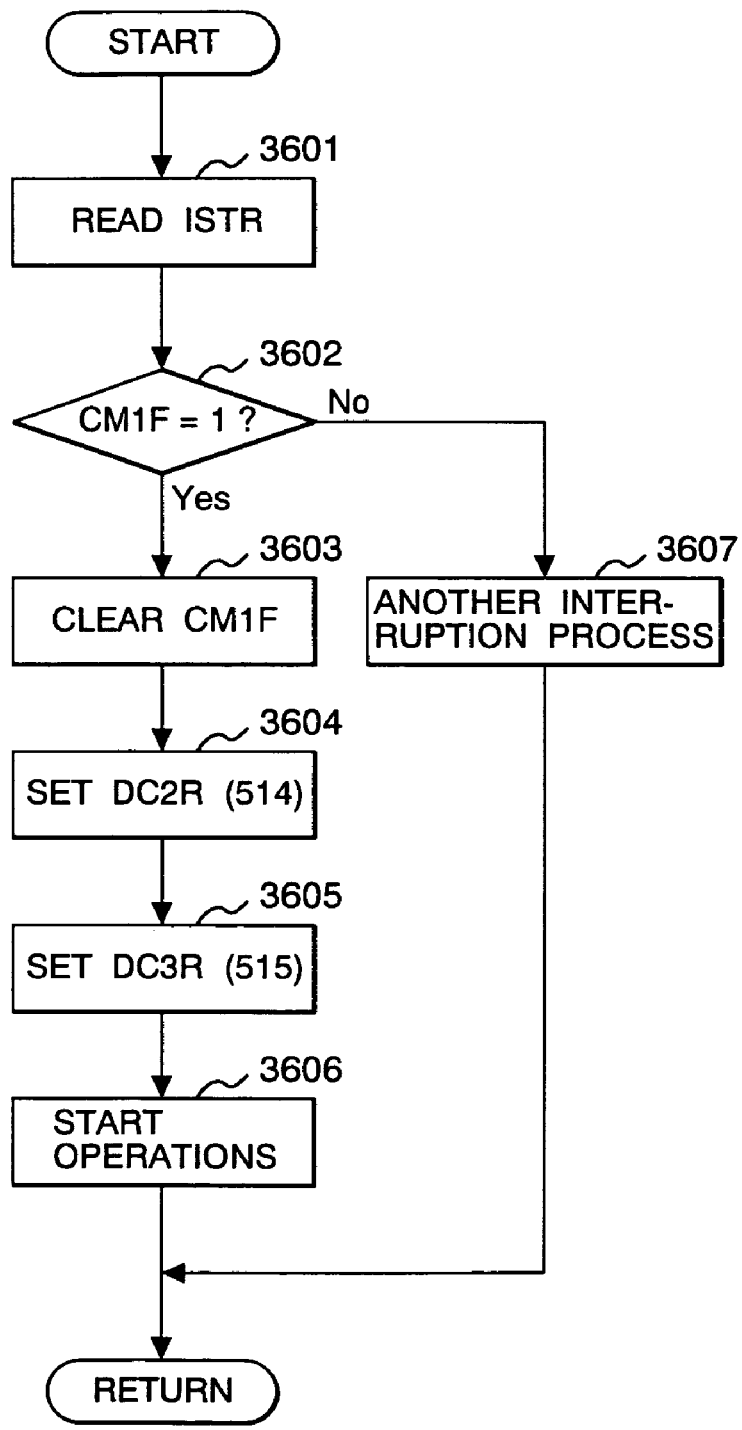
FIG. 36 is a flow chart showing an example of the interruption process of the fourth embodiment.

FIG. 36 shows an example of the interruption process of the timer 5. In this example, the A-D conversion is started by an interruption by the output of the CM2S 52 of the timer 5, and the operation is started by an interruption by the output of the CM1S 51 of the timer 5, and the data transmission is started by an interruption by the CM3S 53 of the timer 5.

When the interruption controller (INTC) 7 outputs the INT 71, the CPU 2 detects the output of the INT 71 and starts the interruption process.

Firstly, the CPU 2 reads the interruption status register (ISTR) 72 (Step 3601) and decides whether the CM1F 75 is set at 1 or not (Step 3602).

When the CM1F 75 is set at 1, the CPU 2 clears the CM1F 75 (Step 3603), sets the time until starting the A-D conversion of the A-D converter (ADC) 4 in the DC2R 514 (Step 3604), sets the time until starting the data transmission of the serial communication module (SCM) 6 in the DC3R 515 (Step 3605), and then starts the operation (Step 3606).

When an interruption flag other than the CM1F 75 is set at 1, the CPU 2 executes a predetermined process corresponding to it (Step 3607).

Figure 37:
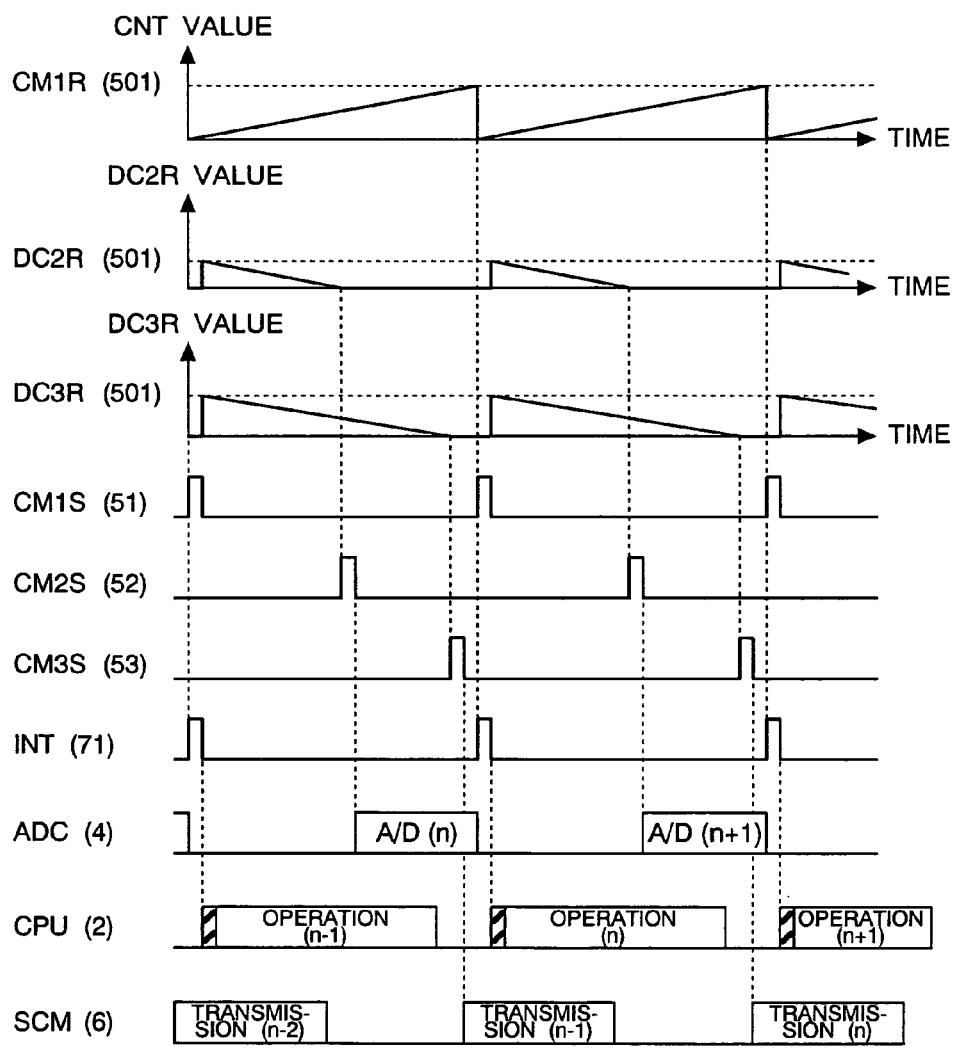
FIG. 37 is a time chart used for explanation of an operation example of the electronic controller of the fourth embodiment.

FIG. 37 shows an operation example when another example of the timer 5 is applied.

When the count of the count register (CNT) 500 of the timer 5 matches with the CM1R 501, the timer 5 outputs the CM1S 51 and the interruption controller (INTC) 7 detects it and outputs the INT 71. When the CPU 2 detects the output of the INT 71, it sets the time until starting the A-D conversion in the DC2R 514 of the timer 5, sets the time until starting the data transmission in the DC3R 515 of the timer 5, and then starts the operation.

The time to be set in the DC2R 514 is preferably set so that the next A-D conversion ends immediately before the start of the next operation and the time to be set in the DC3R 515 is preferably set so as to be immediately after completion of the operation to be executed from now on.

The DC2R 514 of the timer 5 starts count-down immediately after setting by the CPU 2 and when the value becomes 0, outputs the CMS2S 52 and stops.

The A-D converter (ADC) 4 detects the output of the CMS2S 52 and starts the A-D conversion.

The DC3R 515 of the timer 5 starts count-down immediately after setting by the CPU 2 and when the value becomes 0, outputs the CMS3S 53 and stops.

The serial communication module (SCM) 6 detects the output of the CMS3S 53 and starts the data transmission.

Also in this example, the A-D conversion of the A-D converter (ADC) 4, the operation of the CPU 2, and the data transmission of the serial communication module (SCM) 6 are executed in parallel, so that the control cycle can be shortened and the response time from the A-D conversion (input process) to the data transmission (output process) can be shortened.

The electronic controllers 1A, 1B, 1C, and 1D of the first, second, third, and fourth embodiments mentioned above may be realized by a 1-chip microcontroller LSI and may be realized by a two-chip or more microcontroller LSI or an input-output controller LSI.

What is claimed is:

1. An electronic controller for controlling power or a motor comprising:
    input means for fetching an external signal and performing an A-D conversion;
    a central processing unit (CPU) for executing operations according to a predetermined program upon receipt of A-D conversion results of said input means;
    output means for transferring data to outside said controller via a serial transmission path on the basis of operation results of said CPU; and
    timer means for individually setting process start timings of said input means and said output means not via said CPU;
    wherein said timer means comprising:
        a counter for incrementing the count in a predetermined clock cycle, clearing the count to 0 and repeats the increment again when the count matches with a control cycle of the electronic controller;
        a timing setting means for individually setting process start timings of said input means and said output means to the count of said counter;
        a process start command means for outputting process start commands to said input means and said output means respectively whenever the count matches with said process start timings, wherein the use of said timer means reduces a processing load on said CPU.

2. An electronic controller according to claim 1, wherein said timer means sets process start timing of said CPU.

3. An electronic controller according to claim 1, wherein at least two of an input processing period of said input means, an operation processing period of said CPU, and an output processing period of said output means are partially overlaid each other.

4. An electronic controller according to claim 1, wherein said timer means sets said process start timings so that said process start timings of at least two of said input means, said CPU, and said output means become same timing or those timings have a fixed time difference.

5. An electronic controller according to claim 1, wherein said timer means sets said process start timing so that before completion of said operations of said CPU, said input means starts a next input process.

6. An electronic controller for controlling power or a motor comprising:
    input means for fetching an external signal and performing an A-D conversion;
    a central processing unit (CPU) for executing operations according to a predetermined program upon receipt of A-D conversion results of said input means;
    output means for transferring data to outside said controller via a serial transmission path on the basis of operation results of said CPU; and
    timer means for outputting an input process start signal for starting said input process by said input means, an output process start signal for starting said output process by said output means, and an operation start signal for starting said operation by said CPU; wherein said timer means comprising:
        a counter for incrementing the count in a predetermined clock cycle, and clearing the count to 0 and repeats the increment again when the count matches with the control cycle of the electronic controller;
        a timing setting means for individually setting process start timings of said input means, said output means, and said CPU to the count of said counter;
        a process start command means for outputting said process start signals to said input means, said output means, and said CPU respectively whenever the count matches with said process start timings, wherein the use of said timer means reduces a processing load on said CPU.

7. An electronic controller according to claim 6, wherein said input process, said operation process, and said output process are executed in parallel.

8. An electronic controller according to claim 6, wherein said timer means outputs said process start signals so that process start timings of at least two of said input means, said CPU, and said output means become same timing or those timings have a fixed time difference.

9. An electronic controller according to claim 6, wherein said timer means outputs said process start signals so that before completion of said operations of said CPU, said input means starts a next input process.

10. An electronic controller according to claim 6, wherein said input means outputs an input process completion signal.

11. An electronic controller according to claim 6, wherein said CPU, on the basis of a signal inputted to it and operation results, changes timing for outputting at least one of said input process start signal, said output process start signal, and said operation start signal by said timer means.

12. An electronic controller according to claim 6, wherein said CPU, when a present operation is not completed even if said operation start signal is outputted, starts a next operation after said present operation is completed.

13. An electronic controller according to claim 6, wherein said output means, when a present output process is not completed even if said output process start signal is outputted, starts a next output process after said present output process is completed.

14. An electronic controller according to claim 1, wherein said electronic controller is composed of a one-chip microcontroller.

15. An electronic controller for use in power or motor control comprising:
    an analog-to-digital (A/D) converter, wherein said A/D converter converts an analog input signal into a digital output signal;
    a central processing unit (CPU) for executing operations according to a predetermined program upon receipt of said digital output signal from said A/D converter;
    a serial communication module (SCM), wherein said SCM transfers data to outside said controller via a serial transmission path on the basis of operation results of said CPU; and a timer, wherein said timer further comprises:
- a counter for incrementing the count in a predetermined clock cycle, clearing the count to 0 and repeats the increment again when the count matches with a control cycle of the electronic controller;
- a timing setting means for individually setting process start timings of said A/D converter and said SCM to the count of said counter; and
- a process start command means for outputting process start commands to said A/D converter and said SCM respectively whenever the count matches with said process start timings, wherein the use of said timer reduces a processing load on said CPU.

* * * * *